(12) United States Patent
Abedini et al.

(10) Patent No.: US 11,855,788 B2
(45) Date of Patent: Dec. 26, 2023

(54) TECHNIQUES FOR FEEDBACK REPORTING BY A REPEATER

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 17/443,112

(22) Filed: Jul. 21, 2021

(65) Prior Publication Data

US 2022/0045808 A1    Feb. 10, 2022

Related U.S. Application Data

(60) Provisional application No. 62/706,178, filed on Aug. 4, 2020.

(51) Int. Cl.
| | |
|---|---|
| *H04B 7/155* | (2006.01) |
| *H04B 17/24* | (2015.01) |
| *H04B 17/309* | (2015.01) |
| *H04W 24/10* | (2009.01) |
| *H04L 1/1867* | (2023.01) |

(52) U.S. Cl.
CPC ....... *H04L 1/1896* (2013.01); *H04B 7/15528* (2013.01); *H04B 17/24* (2015.01); *H04B 17/309* (2015.01); *H04L 1/189* (2013.01); *H04W 24/10* (2013.01)

(58) Field of Classification Search
CPC ..... H04L 1/1896; H04L 1/189; H04B 17/309; H04B 17/24; H04B 7/15528; H04W 24/10
See application file for complete search history.

(56) References Cited

U.S. PATENT DOCUMENTS

| | | | |
|---|---|---|---|
| 10,687,258 B2* | 6/2020 | Xu | H04W 36/30 |
| 2005/0042999 A1* | 2/2005 | Rappaport | H04B 7/15557 455/307 |
| 2008/0056174 A1 | 3/2008 | Jung et al. | |
| 2015/0055546 A1* | 2/2015 | Jafarian | H04L 1/1887 370/329 |
| 2020/0052775 A1 | 2/2020 | Nam et al. | |
| 2021/0037445 A1* | 2/2021 | Abedini | H04L 5/0048 |

OTHER PUBLICATIONS

International Search Report and Written Opinion—PCT/US2021/070931—ISA/EPO—dated Nov. 8, 2021.

* cited by examiner

*Primary Examiner* — Omar J Ghowrwal
(74) *Attorney, Agent, or Firm* — Dalei Dong; Harrity & Harrity, LLP

(57) ABSTRACT

Various aspects of the present disclosure generally relate to wireless communication. In some aspects, a repeater node may receive a communication, wherein the communication is to be forwarded by the repeater node in accordance with a digital repeating operation. The repeater node may perform a measurement associated with the communication. The repeater node may transmit, to a control node, a feedback communication that is based at least in part on the measurement associated with the communication. Numerous other aspects are provided.

24 Claims, 12 Drawing Sheets

TECHNIQUES FOR FEEDBACK REPORTING BY A REPEATER

CROSS-REFERENCE TO RELATED APPLICATION

This patent application claims priority to U.S. Provisional Patent Application No. 62/706,178, filed on Aug. 4, 2020, entitled "TECHNIQUES FOR FEEDBACK REPORTING BY A REPEATER," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for feedback reporting by a repeater.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a repeater node includes: receiving a communication, wherein the communication is to be forwarded by the repeater node in accordance with a digital repeating operation; performing a measurement associated with the communication; and transmitting, to a control node, a feedback communication that is based at least in part on the measurement associated with the communication.

In some aspects, receiving the communication comprises receiving, from the control node, the communication.

In some aspects, the method includes forwarding, to the control node, the communication in accordance with the digital repeating operation.

In some aspects, the method includes digitally processing, in accordance with the digital repeating operation, the communication to regenerate a signal associated with the communication; and transmitting the regenerated signal associated with the communication.

In some aspects, transmitting, to the control node, the feedback communication comprises transmitting the feedback communication before the transmission of the regenerated signal associated with the communication.

In some aspects, transmitting, to the control node, the feedback communication comprises transmitting the feedback communication after the transmission of the regenerated signal associated with the communication.

In some aspects, the feedback communication is a function of the measurement associated with the communication.

In some aspects, performing the measurement associated with the communication comprises performing a measurement of a reference signal associated with the communication.

In some aspects, the feedback communication comprises acknowledgment or negative acknowledgement feedback.

In some aspects, the method includes determining a channel condition value associated with the communication based at least in part on performing the measurement associated with the communication.

In some aspects, transmitting, to the control node, the feedback communication comprises determining whether the channel condition value satisfies a threshold; and transmitting, to the control node, acknowledgment or negative acknowledgement feedback based at least in part on the determination of whether the channel condition value satisfies the threshold.

In some aspects, the feedback communication comprises a measurement report indicating at least one of a measured received power, a measured received quality, or a channel condition value. In some aspects, the method includes determining whether the channel condition value satisfies a threshold, and transmitting a measurement report indicating the channel condition value based at least in part on a determination that the channel condition value does not satisfy the threshold.

In some aspects, the method includes receiving, from the control node, an indication of whether to forward the communication, wherein the indication is based at least in part on the feedback communication.

In some aspects, receiving, from the control node, the indication of whether to forward the communication comprises receiving an indication to not forward to the communication, and the method includes receiving another communication indicating information that is the same as information indicated by the communication. In some aspects, the other communication is transmitted using a different transmit configuration than a transmit configuration used to transmit the communication.

In some aspects, the method includes receiving, from the control node, a configuration indicating a set of forwarding parameters, wherein the configuration is based at least in part on the feedback communication; and forwarding the communication in accordance with the configuration. In some aspects, the set of forwarding parameters includes at least one of: a transmit power, a beamforming configuration, or a quantity of repetitions.

In some aspects, the method includes receiving, from the control node, a configuration indicating a set of forwarding parameters for upcoming communications associated with the digital repeating operation, wherein the configuration is based at least in part on the feedback communication.

In some aspects, the communication is a semi-static communication. In some aspects, the communication is a periodic communication, and the method includes storing the communication, and forwarding the stored communication in accordance with a periodic schedule associated with the communication.

In some aspects, the method includes receiving an indication to replace the stored communication with a retransmitted communication, and the indication to replace the stored communication with the retransmitted communication is based at least in part on the feedback communication.

In some aspects, the method includes receiving an indication that the repeater node has been selected, from a plurality of repeater nodes, to forward the communication, and the indication is based at least in part on the feedback communication.

In some aspects, the method includes receiving, from the control node, a configuration indicating a set of feedback parameters associated with transmitting feedback communications to the control node, wherein transmitting, to the control node, the feedback communication comprises transmitting the feedback communication in accordance with the configuration.

In some aspects, the method includes transmitting, to one or more wireless nodes associated with the digital repeating operation, the feedback communication.

In some aspects, the communication is at least one of a physical downlink control channel communication, a physical downlink shared channel communication, a physical uplink control channel communication, a physical uplink shared channel communication, or a physical sidelink channel communication.

In some aspects, the communication is not fully decoded by the repeater node.

In some aspects, a method of wireless communication performed by a control node includes: receiving, from a repeater node, a feedback communication that is based at least in part on a communication that is to be forwarded by the repeater node in accordance with a digital repeating operation; and transmitting, to the repeater node, a configuration associated with the digital repeating operation, wherein the configuration is based at least in part on the feedback communication.

In some aspects, the method includes transmitting, to the repeater node, the communication that is to be forwarded by the repeater node in accordance with a digital repeating operation.

In some aspects, the digital repeating operation includes the repeater node forwarding a regenerated signal associated with communication based at least in part on a digital processing operation performed by the repeater node.

In some aspects, the method includes transmitting, to the repeater node, the communication that is to be forwarded by the repeater node. In some aspects, the method includes receiving, from the repeater node, a regenerated signal associated with the communication in accordance with the digital repeating operation.

In some aspects, receiving, from the repeater node, the feedback communication comprises receiving the feedback communication before the repeater node forwards the communication. In some aspects, receiving, from the repeater node, the feedback communication comprises receiving the feedback communication after the repeater node forwards the communication.

In some aspects, receiving, from the repeater node, the feedback communication comprises receiving, from the repeater node, acknowledgement or negative acknowledgement feedback associated with the communication that is to be forwarded by the repeater node. In some aspects, the acknowledgement or negative acknowledgement feedback indicates whether a channel condition value associated with the communication that is to be forwarded by the repeater node satisfies a threshold.

In some aspects, the feedback communication comprises a measurement report indicating at least one of a measured received power, a measured received quality, or a channel condition value associated with the communication that is to be forwarded by the repeater node. In some aspects, the measurement report indicates that the channel condition value associated with the communication that is to be forwarded by the repeater node does not satisfy a threshold.

In some aspects, the method includes determining whether the repeater node is to forward the communication based at least in part on the feedback communication. In some aspects, the method includes transmitting, to the repeater node, an indication of whether the repeater node is to forward the communication. In some aspects, determining whether the repeater node is to forward the communication based at least in part on the feedback communication comprises determining that the repeater node is not to forward the communication based at least in part on the feedback communication; and causing the communication to be retransmitted to the repeater node based at least in part on the determination that the repeater node is not to forward the communication. In some aspects, causing the communication to be retransmitted to the repeater node comprises causing the communication to be retransmitted using a different transmit configuration than a transmit configuration that was used to transmit the communication to the repeater node.

In some aspects, the method includes determining a set of forwarding parameters, based at least in part on the feedback communication, for the repeater node to use when forwarding the communication; and transmitting, to the repeater node, a configuration indicating the set of forwarding parameters. In some aspects, the set of forwarding parameters includes at least one of: a transmit power, a beamforming configuration, or a quantity of repetitions. In some aspects, the method includes determining a set of forwarding parameters, based at least in part on the feedback communication, for the repeater node to use when forwarding upcoming communications; and transmitting, to the repeater node, a configuration indicating the set of forwarding parameters.

In some aspects, the communication that is to be forwarded by the repeater node is a semi-static communication. In some aspects, the communication that is to be forwarded by the repeater node is a periodic communication that is to be stored by the repeater node. In some aspects, the method includes determining whether the repeater node is to use the stored communication for forwarding upcoming periodic communications based at least in part on the feedback communication.

In some aspects, the method includes determining that the repeater node is not to use the stored communication for forwarding upcoming periodic communications based at least in part on the feedback communication; causing the communication to be retransmitted to the repeater node; and transmitting, to the repeater node, an indication to replace the stored communication with the retransmitted communication.

In some aspects, receiving, from the repeater node, the feedback communication comprises receiving, from a plurality of repeater nodes, a plurality of feedback communications associated with the communication to be forwarded by the plurality of repeater nodes. In some aspects, the method includes comparing the plurality of feedback communications; determining that the repeater node is to forward the communication based at least in part on comparing the plurality of feedback communications; and transmitting, to the repeater node, an indication that the repeater node is to forward the communication.

In some aspects, the method includes determining a set of feedback parameters associated with feedback communication transmissions by the repeater node; and transmitting, to the repeater node, a configuration indicating the set of feedback parameters.

In some aspects, the communication that is to be forwarded by the repeater node is at least one of a physical downlink control channel communication, a physical downlink shared channel communication, a physical uplink control channel communication, a physical uplink shared channel communication, or a physical sidelink channel communication.

In some aspects, a repeater node for wireless communication includes a memory and one or more processors coupled to the memory, the memory and the one or more processors configured to: receive a communication, wherein the communication is to be forwarded by the repeater node in accordance with a digital repeating operation; perform a measurement associated with the communication; and transmit, to a control node, a feedback communication that is based at least in part on the measurement associated with the communication.

In some aspects, a control node for wireless communication includes a memory and one or more processors coupled to the memory, the memory and the one or more processors configured to: receive, from a repeater node, a feedback communication that is based at least in part on a communication that is to be forwarded by the repeater node in accordance with a digital repeating operation; and transmit, to the repeater node, a configuration associated with the digital repeating operation, wherein the configuration is based at least in part on the feedback communication.

In some aspects, a non-transitory computer-readable medium storing a set of instructions for wireless communication includes one or more instructions that, when executed by one or more processors of a repeater node, cause the repeater node to: receive a communication, wherein the communication is to be forwarded by the repeater node in accordance with a digital repeating operation; perform a measurement associated with the communication; and transmit, to a control node, a feedback communication that is based at least in part on the measurement associated with the communication.

In some aspects, a non-transitory computer-readable medium storing a set of instructions for wireless communication includes one or more instructions that, when executed by one or more processors of a control node, cause the control node to: receive, from a repeater node, a feedback communication that is based at least in part on a communication that is to be forwarded by the repeater node in accordance with a digital repeating operation; and transmit, to the repeater node, a configuration associated with the digital repeating operation, wherein the configuration is based at least in part on the feedback communication.

In some aspects, an apparatus for wireless communication includes: means for receiving a communication, wherein the communication is to be forwarded by the apparatus in accordance with a digital repeating operation; means for performing a measurement associated with the communication; and means for transmitting, to a control node, a feedback communication that is based at least in part on the measurement associated with the communication.

In some aspects, an apparatus for wireless communication includes: means for receiving, from a repeater node, a feedback communication that is based at least in part on a communication that is to be forwarded by the repeater node in accordance with a digital repeating operation; and means for transmitting, to the repeater node, a configuration associated with the digital repeating operation, wherein the configuration is based at least in part on the feedback communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
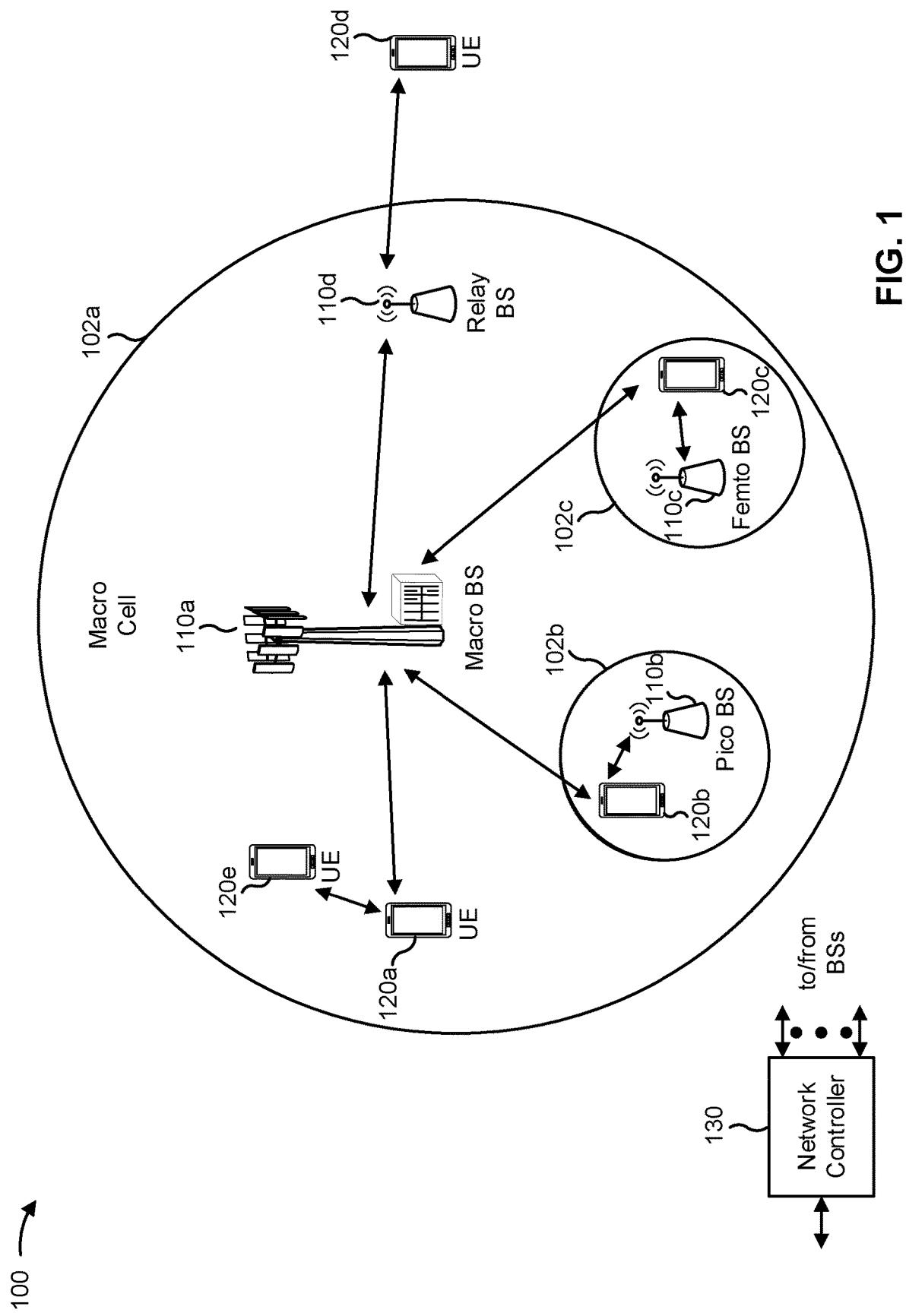
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
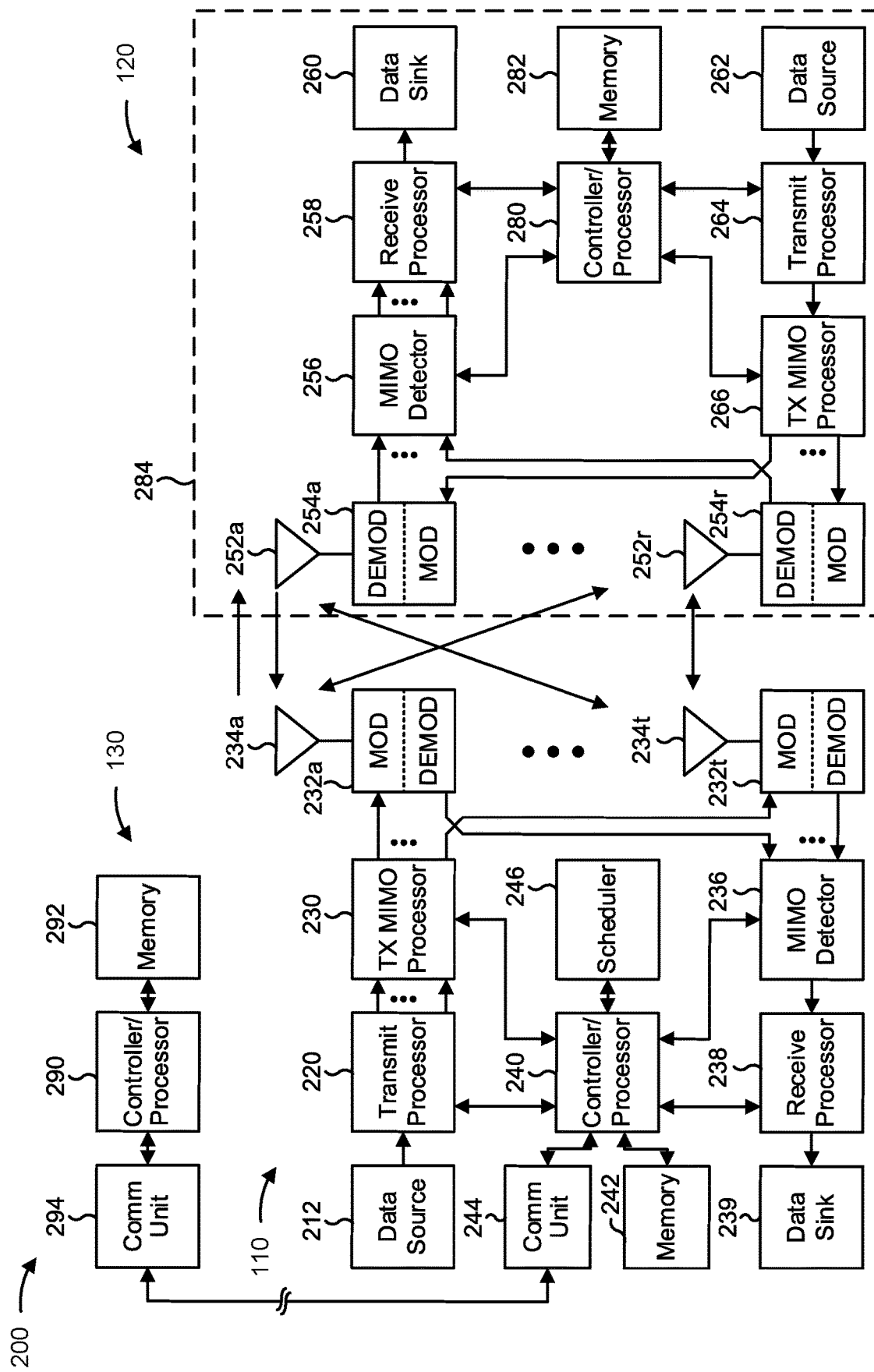
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with feedback reporting by a repeater, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions.

In some aspects, a repeater node may include means for receiving a communication, wherein the communication is to be forwarded by the repeater node in accordance with a digital repeating operation, means for performing a measurement associated with the communication, means for transmitting, to a control node, a feedback communication that is based at least in part on the measurement associated with the communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a control node may include means for receiving, from a repeater node, a feedback communication that is based at least in part on a communication that is to be forwarded by the repeater node in accordance with a digital repeating operation, means for transmitting, to the repeater node, a configuration associated with the digital repeating operation, wherein the configuration is based at least in part on the feedback communication, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
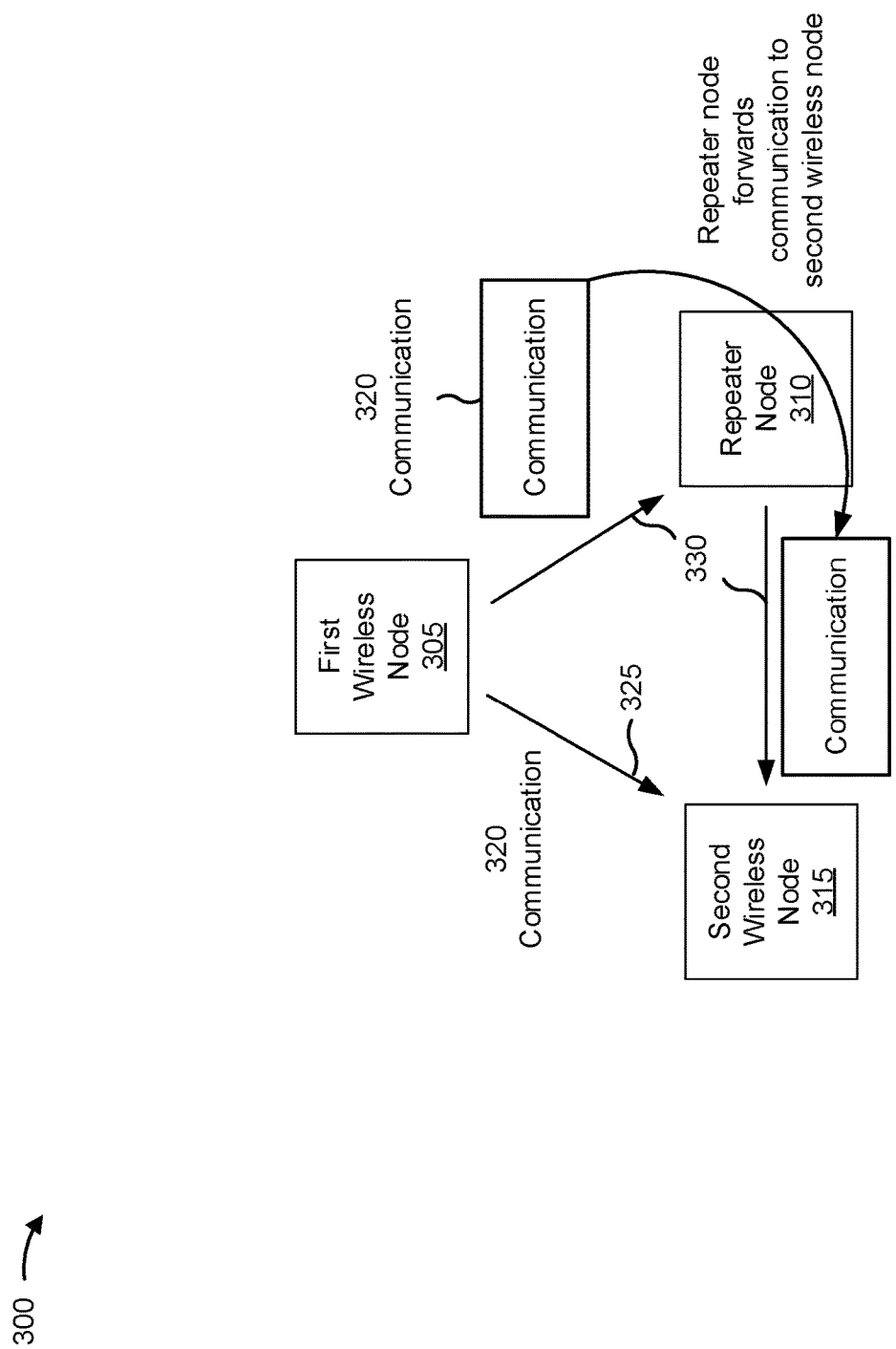
FIG. 3 is a diagram illustrating an example of a repeater node that forwards communications between a first wireless node and a second wireless node, in accordance with the present disclosure.

FIG. 3 is a diagram illustrating an example 300 of a repeater node that forwards communications between a first wireless node and a second wireless node, in accordance with the present disclosure. As shown, example 300 includes a first wireless node 305 (e.g., an integrated access and backhaul (IAB) node, an IAB donor, a base station 110, a UE 120, and/or the like), a repeater node 310 (e.g., a repeater device, a base station 110, a UE 120, a millimeter wave repeater, a digital repeater, an analog repeater, and/or the like), and a second wireless node 315 (e.g., an IAB node, an IAB donor, a base station 110, and UE 120, another repeater node 310, and/or the like). In example 300, the first wireless node 305 and/or the second wireless node 315 may be aware of the repeater node 310. In some aspects, the first wireless node 305 and/or the second wireless node 315 may be unaware of the repeater node 310.

As shown in FIG. 3, the first wireless node 305 may want to transmit a communication 320 (e.g., a data communication, a control communication, and/or the like) to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like. Therefore, the first wireless node 305 may communicate with the second wireless node 315 using an indirect link 330.

For example, the first wireless node 305 may transmit the communication 320 (e.g., as a wireless signal) to the repeater node 310. In some aspects, the first wireless node 305 may transmit the communication 320 directly to the repeater node 310 (e.g., when the first wireless node 305 is aware of the repeater node 310). In some aspects, the repeater node 310 may be configured (e.g., by a control node, by the second wireless node 315, and/or the like) to receive the communication 320 from the first wireless node 305 (e.g., when the first wireless node 305 is unaware of the repeater node 310).

As shown in FIG. 3, the communication 320 may pass through the repeater node 310 and be forwarded by the repeater node 310. For example, the repeater node 310 may receive the wireless signal carrying the communication 320 and may re-generate the wireless signal based at least in part on the communication 320, the wireless signal, an analog processing operation, a digital processing operation, and/or the like. The repeater node 310 may transmit the re-generated version of the wireless signal.

In some cases, an indirect link 330 may be an access link, a sidelink, or a fronthaul link. For example, if the first wireless node 305 is a base station 110 and the second wireless node 315 is a UE 120, the indirect link 330 between the first wireless node 305 and the repeater node 310 may be a fronthaul link. The indirect link 330 between the repeater node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

In a typical scenario, an analog repeater node may be deployed. The analog repeater node may facilitate an indirect link by forwarding a communication from a first wireless node to a second wireless node. However, an analog repeater node does not store a signal (e.g., a communication). Rather, an analog repeater node simply receives the signal and re-transmits the signal without performing any digital processing on the signal. As a result, an analog repeater node may not provide control over the timing of a re-transmission of a signal, may produce self-interference, and may become unstable. To address these concerns, some repeater nodes may facilitate digitizing a signal and storing the digitized signal so that some control over timing may be provided. In a typical scenario, this digital repeater may be wired (e.g., via ethernet), restricted to repeating communications on a certain protocol layer, and/or the like. As a result, typical analog and digital repeaters may not provide a flexible solution that can be controlled to adapt to various scenarios, channel conditions, and/or the like.

As indicated above, FIG. 3 is provided as an example. Other examples may differ from what is described with respect to FIG. 3.

Figure 4:
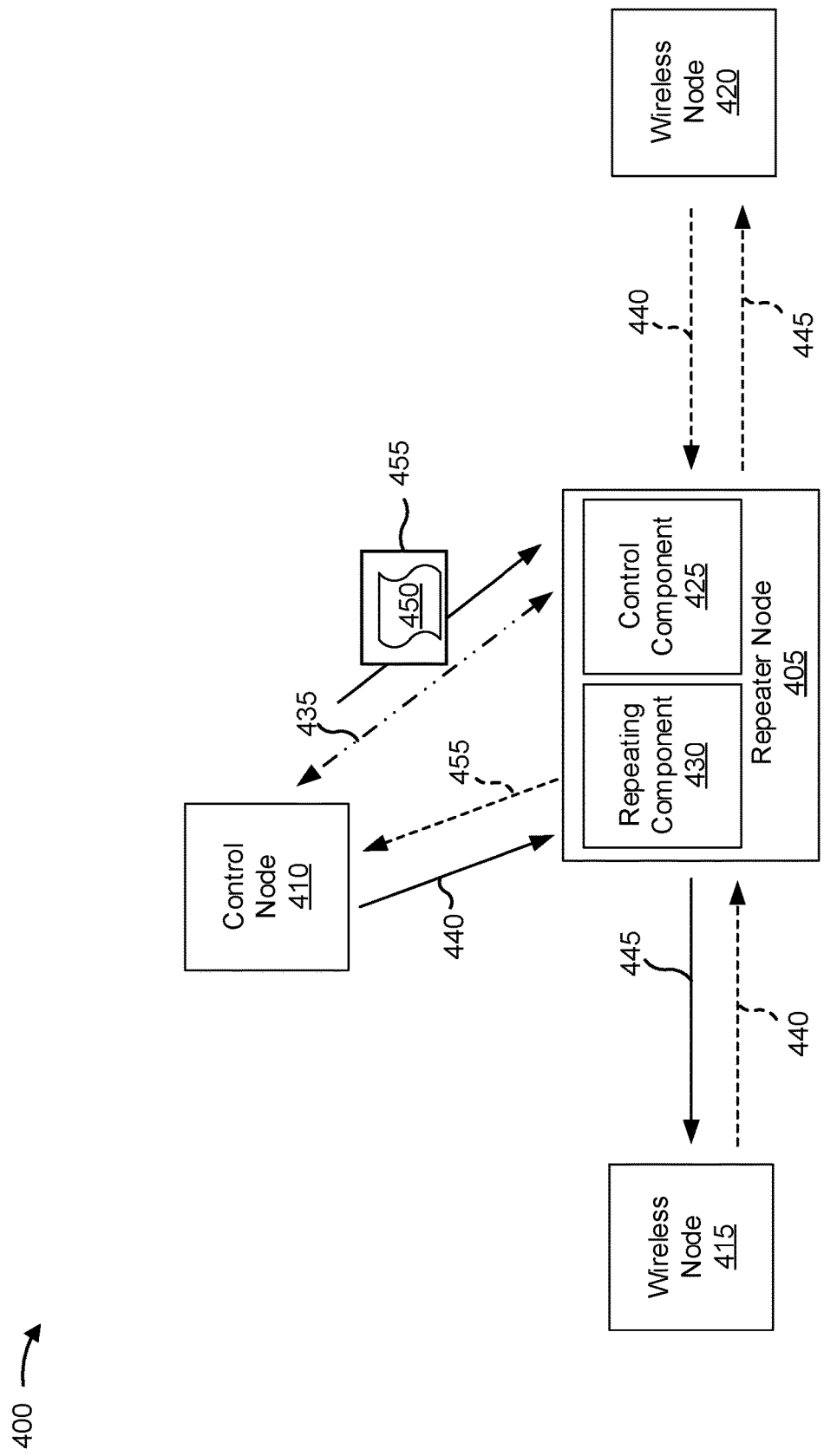
FIG. 4 is a diagram illustrating an example associated with forwarding a wireless signal using a repeater node, in accordance with the present disclosure.

FIG. 4 is a diagram illustrating an example 400 associated with forwarding a wireless signal using a repeater node, in accordance with the present disclosure. As shown, the example 400 includes a repeater node 405 that may communicate with a control node 410 a wireless nodes 415, and/or a wireless node 420. In some aspects, the repeater node 405 may include the repeater node 310 shown in FIG. 3. In some aspects, the control node 410, the wireless node 415 and/or the wireless node 420 may be a wireless node such as, for example, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

In some aspects, the repeater node 405 may include a millimeter wave repeater that is configured to receive a millimeter wave signal and to transmit a re-generated version of the millimeter wave signal. As shown in FIG. 4, the repeater node 405 may include a control component 425 and a repeating component 430. In some aspects, the control component 425 may facilitate establishing a wireless control interface 435 between the repeater node 405 and the control node 410. In some aspects, the control component 425 may include one or more components and/or functions that are, or are similar to, one or more components of a base station (e.g., the base station 110 shown in FIGS. 1 and 2), a UE (e.g., the UE 120 shown in FIGS. 1 and 2), and/or the like.

In some aspects, the repeating component 430 may perform one or more repeating operations. A repeating operation may be a process that includes receiving a first signal 440, performing one or more digital processing operations on the first signal to generate a second signal 445, and transmitting the second signal 445. The second signal 445 may be the result of the repeater node 405 attempting to regenerate the first signal (e.g., through the one or more digital processing operations). In some aspects, the first signal 440 may include a communication (e.g., the communication 320 shown in FIG. 3) that is transmitted from the control node 410 and addressed to the wireless node 415. In some aspects, as shown, the first signal 440 may be transmitted from the control node 410 and addressed to the wireless node 415. In some aspects, the first signal 440 may be transmitted from the wireless node 415 or the wireless node 420 and addressed to the control node 410, addressed to the other wireless node 415 or wireless node 420, and/or the like. In some aspects, the first signal 440 may be addressed to a plurality of wireless nodes (e.g., wireless node 415, wireless node 420, control node 410, and/or the like). In some aspects, the first signal 440 may include a physical downlink control channel (PDCCH) transmission, a physical downlink shared channel (PDSCH) transmission, a physical uplink control channel (PUCCH) transmission, a physical uplink shared channel (PUSCH) transmission, a physical sidelink channel transmission, an acknowledgement (ACK) or negative acknowledgement (NACK) (ACK/NACK) feedback message, and/or the like.

In some aspects, the repeating component 430 may perform the one or more repeating operations based at least in part on a configuration established using the control component 425. For example, in some aspects, the control node 410 may transmit a configuration 450 using a control message 455, and the wireless node 420 may receive the control message 450 using the control component 425.

The control node 410 may transmit the configuration 450 in the control message 455 via the control interface 435. The configuration 450 may be carried in at least one control message 455. In some aspects, control messages may be specified for communication between the repeater node 405 and the control node 410 in accordance with a specification of the control interface 435. In some aspects, the configuration 450 may be carried in a lower-layer control message (e.g., a control message associated with physical layers and/or medium access control (MAC) layers), an upper-layer control message (e.g., a control message associated with network layers), an application-layer control message (e.g., a control message associated with an application layer), and/or the like. For example, a control message may be carried using a radio resource control (RRC) message, downlink control information (DCI), a MAC control element (MAC-CE), and/or the like.

In some aspects, a control message may be included within the first signal 440. In some aspects, the configuration 450 may be carried in a fronthaul physical downlink control channel (FH-PDCCH) control message. In some aspects, the FH-PDCCH control message may include DCI scrambled by a fronthaul radio network temporary identifier (FH-RNTI). The FH-RNTI may be associated with the control component.

In some aspects, the repeating component 430 may communicate using millimeter waves, while the control component 425 may communicate using frequencies that are lower than millimeter wave frequencies. For example, in some aspects, the control component 425 may communicate using sub-6 (sub-6 GHz) frequencies. In some aspects, the control node 410 may transmit, and the repeater node 405 may receive, a configuration of the control interface 435 or one or more aspects thereof. In some aspects, for example, the control node 410 may transmit a configuration of a frequency, a bandwidth, a bandwidth part (BWP), and/or the like. In some aspects, the repeating component 430 may communicate using a first RAT (e.g., NR) and the control component 425 may communicate using a second RAT (e.g., LTE, Bluetooth, WiFi, and/or the like). In some aspects, the control interface 435 may include an access link between the control component 425 and the control node 410.

In some aspects, the control message 455 may configure any number of different types of settings, configurations, digital processing operations, receiving operations, buffering operations, forwarding (transmitting) operations, and/or the like. In some aspects, the repeater node 405 may transmit, and the control node 410 may receive, one or more control messages. For example, in some aspects, the repeater node 405 may, using the control component 425, transmit a control message via the control interface 435 to the control node. The control message transmitted by the digital repeater may indicate a configuration of the digital repeater, a capability of the digital repeater, a status of the digital repeater, and/or the like.

As indicated above, in some aspects, the control node 410 may configure the repeater node 405 for a particular repeating operation by transmitting a configuration 450 to the repeater node 405. In some aspects, the configuration 450 may indicate a digital processing operation. The digital processing operation may include a digital processing option selected from a plurality of digital processing options (e.g., the digital processing options 525-550 shown in, and described below in connection with, FIG. 5). In some aspects, the configuration 450 may include one or more information elements (IEs) that indicate a receiving configuration, a buffering configuration, a forwarding configuration, an information request, and/or the like.

In some aspects, the reception configuration may be used to configure aspects of a receiving operation of the repeating component 430 with respect to receiving the first signal 440. The reception configuration may indicate, for example, a receiving analog beamforming configuration, a time domain resource associated with the first signal, a frequency domain resource associated with the first signal, a numerology associated with the first signal, a digital receiver beamforming configuration, resource element (RE) mapping information associated with the first signal, a channel estimation configuration, a scrambling identifier associated with the first signal, a coding configuration associated with the first signal, and/or the like.

In some aspects, the buffering configuration may be used to configure aspects of a buffering operation of the repeating component 430 with respect to buffering a digitized form of the first signal 440. In some aspects, the buffering configuration may indicate an analog-to-digital converter (ADC) setting, a digital-to-analog converter (DAC) setting, an in-phase and quadrature (IQ) sample compression setting, an IQ sample decompression setting, and/or the like.

In some aspects, the forwarding configuration may be used to configure aspects of a forwarding operation of the repeating component 430 with respect to transmitting the second signal 445, which may be a regenerated form of the first signal 440. In some aspects, the forwarding configuration may include a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, a coding configuration associated with transmitting the second signal, and/or the like.

In some aspects, the information request may be used to configure aspects of a reporting operation of the repeating component 430 with respect to providing information to the control node 410. The information may include information about the operation of the repeater node 405, information about the configuration of the repeater node 405, information about settings of the repeater node 405, information about a channel, information about a communication, and/or the like. In some aspects, the information request may include a request for a buffer status, a power status, a measurement report, a capability of the digital repeater, a configuration of the digital repeater, and/or the like.

As indicated above, FIG. 4 is provided as an example. Other examples may differ from what is described with respect to FIG. 4.

Figure 5:
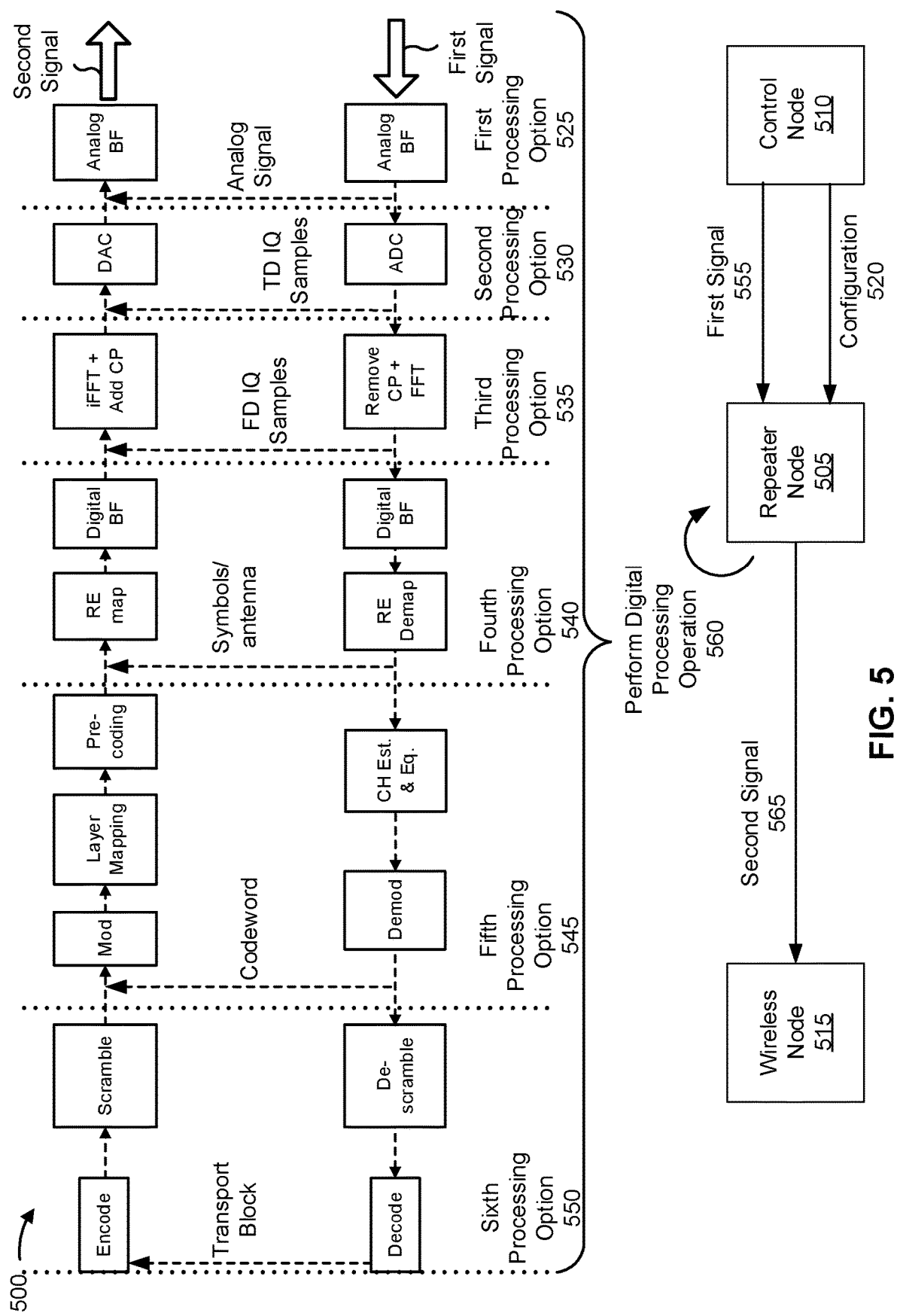
FIG. 5 is a diagram illustrating an example of forwarding a wireless signal using a repeater node, in accordance with the present disclosure.

FIG. 5 is a diagram illustrating an example 500 of forwarding a wireless signal using a repeater node, in accordance with the present disclosure. As shown, the example 500 includes a repeater node 505 that may communicate with a control node 510 and a wireless node 515. In some aspects, the repeater node 505 may communicate with one or more additional wireless nodes (not shown).

In some aspects, the repeater node 505 may include the repeater node 405 shown in FIG. 4, the repeater node 310 shown in FIG. 3, and/or the like. In some aspects, the control node 510 may include the control node 410 shown in FIG. 4, the first wireless node 305 shown in FIG. 3, the second wireless node 315 shown in FIG. 3, an IAB node, an IAB donor, a base station 110 shown in FIG. 1, a UE 120 shown in FIG. 1, and/or the like. In some aspects, the wireless node 515 may include the wireless node 415 shown in FIG. 4, the wireless node 420 shown in FIG. 4, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

As shown by reference number 520, the control node 510 may transmit, and the repeater node 505 may receive, a configuration. In some aspects, the configuration may be, be similar to, include, or be included in the configuration 450 shown in FIG. 4. In some aspects, the configuration may be received using a control component (e.g., the control component 425 shown in FIG. 4) of the repeater node 505 via a control interface (e.g., the control interface 435 shown in FIG. 4). In some aspects, the configuration may be received using a wireless fronthaul link. The configuration may indicate a digital processing operation. A digital processing operation may be a repeating operation that at least includes obtaining a plurality of digital samples from a first signal and storing the plurality of digital samples.

A repeating operation may include a repeater receiving a first signal from a first wireless node, processing the signal to generate a second signal, and transmitting the second signal to a second wireless node. In some aspects, processing the first signal may include regenerating the first signal (by generating a regenerated version of the first signal, which may be referred to herein, interchangeably, as a "regenerated signal") based at least in part on the digital processing of the first signal. In this way, the repeater node 505 may repeat the signal received from a first wireless node to a second wireless node. Transmitting the regenerated signal may be referred to as forwarding the regenerated signal, performing a forwarding operation, performing a repeating operation, and/or the like.

As shown in FIG. 5, the processing operation indicated by the configuration may include a processing option selected from a plurality of processing options. The plurality of processing options may include a first processing option 525 (shown as processing blocks and associated intermediate output, "analog signal," to the right of the first dotted vertical line from the right) that may be based at least in part on an analog processing of the received signal. The plurality of processing options may include a second processing option 530 (shown as processing blocks and associated intermediate outputs, "analog signal" and "TD IQ samples," to the right of the second dotted vertical line from the right) that may be based at least in part on determining and buffering time domain (TD) IQ samples.

The plurality of processing options may include a third processing option 535 (shown as processing blocks and associated intermediate outputs, "analog signal," "TD IQ samples," and "FD IQ samples," to the right of the third dotted vertical line from the right) that may be based at least in part on tone extraction. The tone extraction may include determining frequency domain (FD) IQ samples. The plurality of processing options may include a fourth processing option 540 (shown as processing blocks and associated intermediate outputs, "analog signal," "TD IQ samples," "FD IQ samples," and "symbols/antenna," to the right of the fourth dotted vertical line from the right) that may be based at least in part on resource element (RE) extraction. Extraction of REs may include determining symbols and antenna elements, antenna configurations, and/or the like.

The plurality of processing options may include a fifth processing option 545 (shown as processing blocks and associated intermediate outputs, "analog signal," "TD IQ samples," "FD IQ samples," "symbols/antenna," and "codeword," to the right of the fifth dotted vertical line from the right) that may be based at least in part on channel estimation and equalization. Equalization of channels associated with extracted REs may be used to determine codewords. The plurality of processing options may include a sixth processing option 550 (shown as processing blocks and associated intermediate outputs, "analog signal," "TD IQ samples," "FD IQ samples," "symbols/antenna," "codeword," and "transport block," to the right of the sixth dotted vertical line from the right) that may be based at least in part on decoding the received signal to determine a transport block.

According to various aspects, the second, third, fourth, fifth, and sixth processing options 530-550 may be referred to as digital processing options since they include processing of digital information. A repeater node that is capable of performing, and/or configured to perform, only the first processing option may be referred to as an analog repeater. A repeater node that is capable of performing, and/or configured to perform, any one or more of the second, third, fourth, fifth, or sixth processing options 530-550 may be referred to as a digital repeater (e.g., the repeater node 505). Thus, the configuration may indicate a digital processing option selected from the second, third, fourth, fifth, and sixth processing options 530-550. In some aspects, the configuration may include information that may be used by the repeater node 505 to facilitate performing the processing option, as discussed below in connection with the various processing options.

As shown by reference number 555, the control node 510 may transmit, and the repeater node 505 may receive, a first signal. In some aspects, the first signal may be, be similar to, include, or be included in, the first signal 440 shown in FIG. 4. The first signal may be transmitted by the control node 510, the wireless node 515, or another wireless node not shown in FIG. 5. As shown by reference number 560, the repeater node 505 may perform a digital processing operation on the first signal to generate a second signal. As described above, the second signal may be a regenerated version of the first signal.

In some aspects, the repeater node 505 may perform the digital processing operation indicated by the configuration. In addition to, or in lieu of, performing a digital procession operation, the digital repeater also may be configured to perform an analog processing operation, indicated as the first processing option 525. In the first processing option 525, the repeater node 505 may receive the first signal and may perform an analog beamforming procedure to obtain a second analog signal associated with the first signal. The repeater node 505 may extract the analog signal and may re-generate the analog signal in a transmit (Tx) chain of the repeater node 505. For example, the repeater node 505 may perform an analog beamforming procedure on the analog signal to form the outgoing signal (e.g., the repeater node 505 may boost the analog signal, apply an analog beamforming gain, and/or the like).

According to some aspects, to support the first processing option 525, the repeater node 505 may receive, from the control node 510, one or more control messages (e.g., in the configuration shown by reference number 520) that indicate a reception beamforming configuration associated with the first signal, a transmission beamforming configuration associated with transmitting the second signal, and/or the like. In some aspects, the reception beamforming configuration may indicate an index associated with a beamforming codebook. In some aspects, the repeater node 505 may transmit a control message to the control node 510 that indicates a beamforming codebook characteristic. The beamforming codebook characteristic may indicate, for example, a number of transmitter beams available, a number of receiver beams available, a spatial quasi co-location characteristic associated with a beam, a number of antenna arrays, a number of antenna panels, an association between a beam and an antenna array, an association between a beam and an antenna panel, and/or the like.

In some aspects, the reception beamforming configuration may indicate a phase setting of an antenna element of the repeater node 505, an amplitude setting of the antenna element of the repeater node 505, and/or the like. In some aspects, the repeater node 505 may transmit a control message to the control node 510 that indicates a beamforming capability of the repeater node 505, and the reception beamforming configuration may be based at least in part on the beamforming capability.

In some aspects, the repeater node 505 may transmit a control message to the control node 510 that indicates a transmitter power configuration, and the configuration received from the control node 510 may indicate one or more transmitter power and/or amplification settings based at least in part on the transmitter power configuration. In some aspects, the transmitter power configuration may indicate a power headroom, a maximum transmitter power, a maximum gain level, a current gain setting, a current transmitter power, and/or the like.

In the second processing option 530, in some aspects, the repeater node 505 may perform digital signal processing (which also includes the first processing option). As shown, after receiving the incoming signal and performing an analog beamforming procedure associated with the incoming signal, the repeater node 505 may convert the incoming signal from the analog domain to the digital domain using an analog-to-digital converter (ADC). After converting the incoming signal from the analog domain to the digital domain, the repeater node 505 may determine one or more time domain IQ samples (shown as "TD IQ samples") associated with the incoming signal. The repeater node 505 may extract the time domain IQ samples and may store the time domain IQ samples in a buffer of the repeater node. The repeater node 505 may use the time domain IQ samples to re-generate the incoming signal in the Tx chain of the repeater node 505 (e.g., immediately after extracting the time domain IQ samples or at a later time). For example, the repeater node 505 may convert the time domain IQ samples from the digital domain to the analog domain using a digital-to-analog converter (DAC). The repeater node 505 may perform an analog beamforming procedure on the analog signal to form the second signal, in accordance with the first processing option 525, before transmitting the second signal to the wireless node 515.

In some aspects, to facilitate performance of the second processing option by the repeater node 505, the configuration may indicate a reception configuration, a buffering configuration, a forwarding configuration, an information request, and/or the like. In some aspects, for example, the configuration may indicate a timing configuration. The timing configuration may include aspects of the reception configuration, the buffering configuration, the forwarding configuration, and/or the like.

In some aspects, for example, the reception configuration may indicate a receiving analog beamforming configuration, a time domain resource associated with the first signal, a frequency domain resource associated with the first signal, and/or the like. In some aspects, the frequency domain resource associated with the first signal may include a center frequency, a bandwidth, a BWP, and/or the like.

In some aspects, the buffering configuration may indicate an ADC setting (e.g., an ADC resolution, sample rate, and/or the like), a DAC setting, an IQ sample compression setting, an IQ sample decompression setting, a buffer status (e.g., an available memory, a maximum buffer size, a buffer overflow, and/or the like), an ADC configuration, a DAC configuration, an IQ capability, an IQ setting, and/or the like.

In some aspects, the forwarding configuration may indicate a transmission beamforming configuration, a time domain resource associated with transmitting the second signal, a transmission power setting, a transmission amplification setting, a transmission center frequency, and/or the like. In some aspects, the transmission time domain resource may be indicated relative to the receiving time domain resource. The transmission time domain resource may be based at least in part on a synchronization characteristic corresponding to a synchronization mode between the digital repeater and the control node. For example, the synchronization characteristic may indicate a synchronous mode between the digital repeater and the control node, and the transmission time domain resource may be based at least in part on an indication (e.g., a symbol identifier, a slot identifier, a frame identifier, and/or the like) of the receiving time domain resource.

In the third processing option 535, in some aspects, the repeater node 505 may perform further digital processing (which also may include the second processing option and the first processing option). As shown, for example, after converting the incoming signal from the analog domain to the digital domain, the repeater node 505 may remove a cyclic prefix (CP) associated with the incoming signal and may perform a fast-Fourier transform (FFT) on the incoming signal. Based at least in part on removing the CP and performing the FFT, the repeater node 505 may determine one or more frequency domain IQ samples (shown as "FD IQ samples") associated with the incoming signal. Frequency domain IQ samples may correspond to tones (e.g., OFDM tones). The repeater node 505 may extract the frequency domain IQ samples and may store the frequency domain IQ samples in a buffer of the repeater node 505. The repeater node 505 may use the frequency domain IQ samples to re-generate the incoming signal in the Tx chain of the repeater node 505 (e.g., immediately after extracting the frequency domain IQ samples or at a later time). For example, the repeater node 505 may perform an inverse FFT (iFFT) operation on the frequency domain IQ samples to generate re-generated time domain IQ samples. The repeater node 505 may add a CP to the re-generated time domain IQ samples. The repeater node 505 may convert the digital signal (e.g., the re-generated digital samples) from the digital domain to the analog domain using the DAC. The repeater node 505 may perform an analog beamforming procedure on the analog signal to form the second signal.

In some aspects, to facilitate performance of the third processing option 535 by the repeater node 505, the configuration may indicate further IEs associated with the reception configuration and/or the transmission configuration. These further IEs may be in addition to IEs described above in connection with the second processing option 530, the first processing option 525, and/or the like.

In some aspects, for example, the reception configuration may indicate a numerology associated with the first signal and the forwarding configuration may indicate a numerology associated with transmitting the second signal. In some aspects, the numerology associated with the first signal may be the same as the numerology associated with transmitting the second signal. In some aspects, the numerology associated with the first signal may be different than the numerology associated with transmitting the second signal. In some aspects, the numerology associated with the first signal and/or the numerology associated with transmitting the second signal may include at least one of a cyclic prefix size, a subcarrier spacing, a fast Fourier transform size, and/or the like.

In the fourth processing option 540, in some aspects, the repeater node 505 may perform further digital processing (which also may include the third processing option, the second processing option, and the first processing option). In some aspects, in the fourth processing option 540, after removing the CP and performing the FFT associated with the incoming signal, the repeater node 505 may perform a digital beamforming procedure associated with the incoming signal. The repeater node 505 may perform an RE de-mapping operation associated with the incoming signal to extract REs based at least in part on the determined tones. After performing the digital beamforming procedure and the RE de-mapping procedure, the repeater node 505 may determine one or more IQ samples of occupied tones (e.g., a quantity of symbols per antenna element) associated with the incoming signal. The repeater node 505 may extract the IQ samples of occupied tones and may store the IQ samples of occupied tones in a buffer of the repeater node 505. The repeater node 505 may use the IQ samples of occupied tones to re-generate the incoming signal in the Tx chain of the repeater node 505 (e.g., immediately after extracting the IQ samples of occupied tones or at a later time). For example, the repeater node 505 may perform an RE mapping procedure (e.g., the inverse of the RE de-mapping procedure) associated with the IQ samples of occupied tones. The repeater node 505 may perform a digital beamforming procedure associated with the IQ samples of occupied tones. After performing the digital beamforming procedure, the repeater node 505 may perform an iFFT procedure and add a CP to the signal. As indicated above, the repeater node 505 may convert the digital signal from the digital domain to the analog domain using the DAC.

In some aspects, to facilitate performance of the fourth processing option 540 by the repeater node 505, the configuration may indicate further IEs associated with the reception configuration and/or the transmission configuration. These further IEs may be in addition to IEs described above in connection with the third processing option 535, the second processing option 530, the first processing option 525, and/or the like.

In some aspects, for example, the reception configuration may indicate a digital receiver beamforming configuration, and the forwarding configuration may indicate a digital transmitter beamforming configuration. In some aspects, the reception configuration may indicate RE mapping information associated with the first signal, and the forwarding configuration may indicate RE mapping information associated with transmitting the second signal. In some aspects, the RE mapping information associated with the first signal may include a plurality of indices corresponding to a plurality of occupied tones associated with the first signal. In some aspects, the RE mapping information associated with forwarding the first signal may include a plurality of indices corresponding to a plurality of occupied tones associated with transmitting the second signal.

In the fifth processing option 545, in some aspects, the repeater node 505 may perform further digital processing (which also may include the fourth processing option, the third processing option, the second processing option, and the first processing option). In some aspects, in the fifth processing option 545, after performing the digital beamforming procedure and the RE de-mapping operation, the repeater node may perform channel estimation and equalization associated with the incoming signal (e.g., to determine and/or remove noise and wireless channel variations associated with the incoming signal). For example, the first signal may include a source signal attenuated by a wireless channel characteristic of a wireless channel that carries the first signal. The channel estimation may be performed based at least in part on one or more reference signals transmitted by the control node 510, the wireless node 515, and/or the like. In some aspects, performing the fifth digital processing option 545 may include stabilizing, based at least in part on the channel estimation, the wireless channel characteristic associated with the extracted set of REs (extracted during performance of the fourth processing option 540) to generate a set of stabilized REs. The repeater node 505 may generate the second signal based at least in part on the stabilized REs.

After performing channel estimation and equalization, the repeater node 505 may perform a demodulation operation to determine a set of codewords associated with the incoming signal. The repeater node 505 may extract the codewords and may store the codewords in a buffer of the repeater node 505. The repeater node 505 may use the codewords to re-generate the incoming signal in the Tx chain of the repeater node 505 (e.g., immediately after extracting the codewords or at a later time). For example, the repeater node 505 may perform a modulation operation, a layer mapping operation, a pre-coding operation, an RE-mapping operation, and/or a digital beamforming procedure associated with the codewords.

In some aspects, to facilitate performance of the fifth processing option 545 by the repeater node 505, the configuration may indicate further IEs associated with the reception configuration and/or the transmission configuration. These further IEs may be in addition to IEs described above in connection with the fourth processing option 540, the third processing option 535, the second processing option 530, the first processing option 525, and/or the like.

For example, in some aspects, the reception configuration may indicate a channel estimation configuration. In some aspects, the channel estimation configuration may indicate a resource associated with a reference signal, a configuration associated with the reference signal, and/or the like. In some aspects, the forwarding configuration may indicate a layer mapping configuration, a precoding configuration, and/or the like.

In the sixth processing option 550, in some aspects, the repeater node 505 may perform the sixth digital processing option (which also may include the fifth processing option, the fourth processing option, the third processing option, the second processing option, and the first processing option). In some aspects, in the sixth processing option 550, for example, the repeater node 505 may extract a transport block (or blocks) based at least in part on the set of stabilized REs. In some aspects, the repeater node 505 may perform a de-scrambling operation (e.g., using scrambling identifiers associated with the incoming signal) to generate a set of descrambled REs. The repeater node 505 may decode the set of descrambled REs in accordance with a network coding scheme associated with the incoming signal to determine one or more transport block. The repeater node 505 may extract the transport blocks and may store the transport blocks in a buffer of the repeater node 505.

The repeater node 505 may use the transport blocks to re-generate the incoming signal in the Tx chain of the repeater node 505 (e.g., immediately after extracting the transport block or at a later time). For example, the repeater node 505 may encode the transport blocks (e.g., in accordance with the network coding scheme) to generate a set of recoded REs. The repeater node 505 may scramble the recoded REs to create a re-generated version of the first signal. The repeater node 505 may perform a modulation operation, a layer mapping operation, a pre-coding operation, an RE-mapping operation, and/or a digital beamforming procedure associated with the scrambled transport block.

In some aspects, to facilitate performance of the sixth processing option 550 by the repeater node 505, the configuration may indicate further IEs associated with the reception configuration and/or the transmission configuration. These further IEs may be in addition to IEs described above in connection with the fifth processing option 545, the fourth processing option 540, the third processing option 535, the second processing option 530, the first processing option 525, and/or the like.

In some aspects, for example, the reception configuration may indicate a scrambling identifier associated with the first signal, a coding configuration associated with the first signal, and/or the like. In some aspects, the scrambling identifier may include a FH-RNTI. The FH-RNTI may correspond to the repeater node 505. In some aspects, the coding configuration may indicate a modulation and coding scheme (MCS), a coding technique, and/or the like. In some aspects, the forwarding configuration may indicate a scrambling identifier (e.g., a radio network temporary identifier (RNTI)) associated with transmitting the second signal, a coding configuration associated with transmitting the second signal, and/or the like.

As described above, the repeater node 505 may generate a second signal based at least in part on a digital processing operation. As shown by reference number 565, the repeater node 505 may transmit, and the wireless node 515 may receive, the second signal. In some aspects, the repeater node 505 may transmit the second signal to the control node 510, another wireless node (not shown in FIG. 5), and/or the like.

As described above, different processing operations for a repeating operation are described. A repeating operation may differ from a relaying operation in that the repeating operation attempts to regenerate a received signal. In contrast, a relaying operation may determine information included in a first communication (e.g., a payload) by fully decoding the communication. The relaying operation may include generating a second communication to relay that is based at least in part on the payload of the first communication (e.g., the second communication is different than the first communication, whereas a repeating operation attempts to regenerate or recreate the first communication).

As indicated above, FIG. 5 is provided as an example. Other examples may differ from what is described with respect to FIG. 5.

In some cases, a repeater node may provide feedback related to a received communication from a control node (e.g., a wireless node that controls, configures, and/or schedules the repeater node) or another wireless node. For example, a repeater node may provide feedback related to a communication from a control node indicating a configuration for the repeater node. In some cases, a repeater node may receive a communication, decode the communication to determine information (e.g., a payload) included in the communication, and provide feedback to a transmitting node (e.g., a wireless node that transmitted the communication) indicating the quality of the decoded communication. However, as described above with respect to FIGS. 3, 4, and 5, while performing a digital repeating operation, a repeater node may not fully decode a communication that is to be forwarded by the repeater node. For example, the repeater node may perform a level of processing on the signal associated with the communication (e.g., one of the processing options described above with respect to FIG. 5) to extract some information related to the signal, may regenerate the signal, and may transmit the regenerated signal. As a result, a control node and/or a transmitting node (e.g., a wireless node that transmits the communication that is to be forwarded by the repeater node) may be unaware of a quality of the communication as received by the repeater node. This may result in poor network performance as a repeater node may regenerate a signal of a communication that is associated with poor channel conditions (e.g., poor quality, poor power, and/or the like).

Some techniques and apparatuses described herein enable feedback reporting by a repeater for signals of communications that are to be forwarded by the repeater node. For example, the repeater node may receive a communication that is to be forwarded by the repeater node as part of a digital repeating operation. The repeating node may perform a measurement associated with the communication. The repeating node may transmit, to a control node, a feedback communication that is based at least in part on the measurement associated with the communication. As a result, the control node may be enabled to determine a channel condition associated with the communication as it was received by the repeater node. The feedback communication enables the control node to make improved configuration and/or scheduling decisions for the repeater node. As a result, network performance is improved as the control node may ensure that the repeater node is scheduled and/or configured to forward communications based at least in part on feedback associated with the communications.

Figure 6:
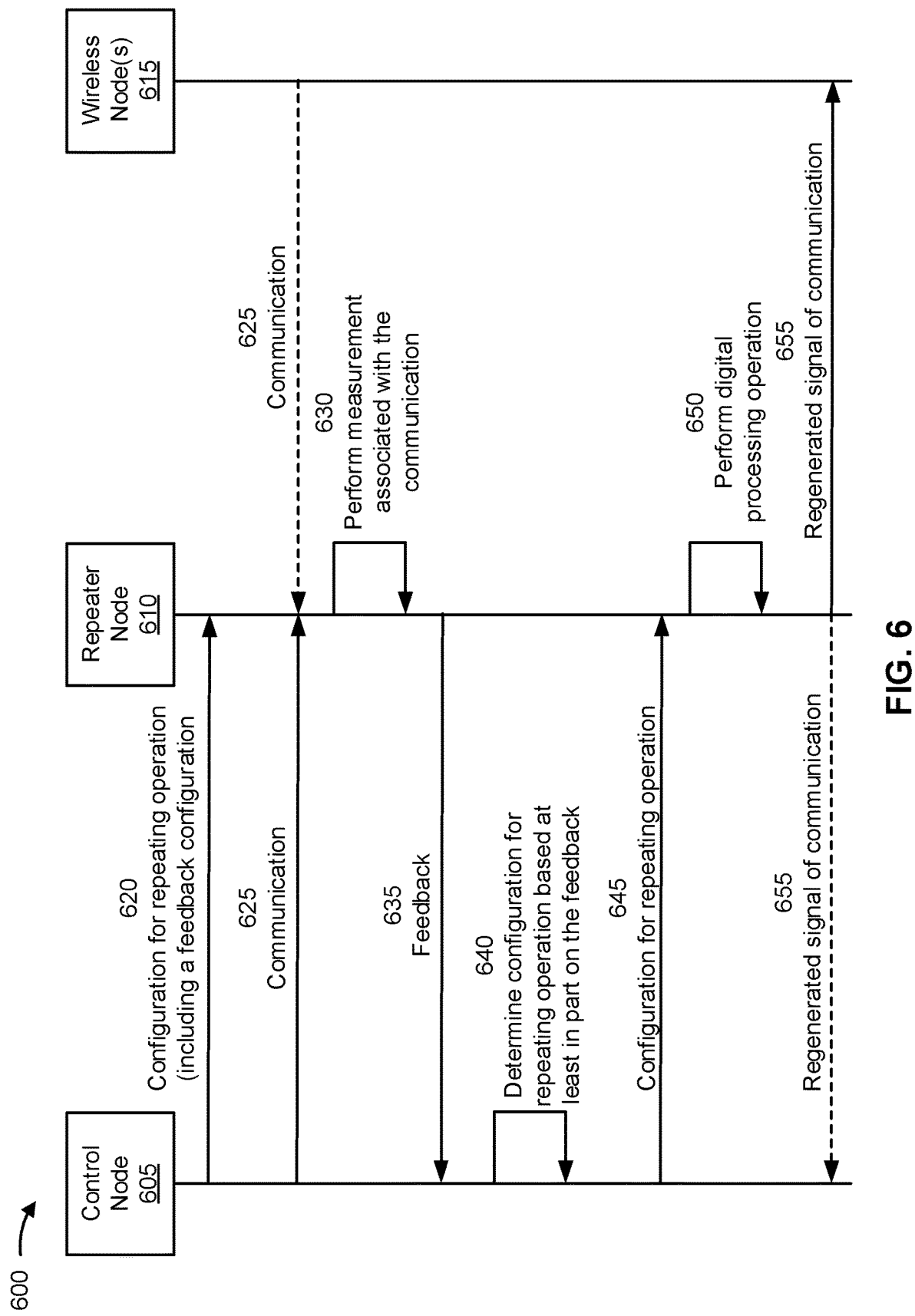
FIGS. 6-8 are diagrams illustrating examples associated with feedback reporting by a repeater, in accordance with the present disclosure.

FIG. 6 is a diagram illustrating an example 600 associated with feedback reporting by a repeater, in accordance with the present disclosure. As shown in FIG. 6, a control node 605, a repeater node 610, and one or more wireless nodes 615 may communicate with one another in a wireless network (e.g., wireless network 100).

In some aspects, the control node 605 may be the first wireless node 305 or the second wireless node 305 depicted in FIG. 3, the control node 410 depicted in FIG. 4, the control node 510 depicted in FIG. 5, a base station 110, a central unit (CU) of an IAB donor, a distributed unit (DU) of an IAB node, an IAB node, and/or the like. In some aspects, the repeater node 610 may be the repeater node 310 depicted in FIG. 3, the repeater node 405 depicted in FIG. 4, the repeater node 505 depicted in FIG. 5, a repeater device, a remote unit of an IAB node, a repeater station, a Layer 1 repeater device, a millimeter wave repeater device, a digital repeater device, a base station 110, a UE 120, an IAB node, and/or the like. In some aspects, the one or more wireless nodes 615 may include the first wireless node 305 or the second wireless node 305 depicted in FIG. 3, the wireless node 415 depicted in FIG. 4, the wireless node 515 depicted in FIG. 5, a base station 110, a UE 120, an IAB donor, an IAB node, another repeater node 610, the control node 605, and/or the like. In some aspects, the repeater node 610 may communicate with a plurality of wireless nodes 615. In some aspects, the repeater node 610 may communicate with a plurality of control nodes 605.

As shown by reference number 620, the control node 605 may transmit, and the repeater node 610 may receive, a configuration for a repeating operation. As described above, the configuration may indicate a digital processing operation. The digital processing operation may include a digital processing option selected from a plurality of digital processing options, as explained above in connection with FIG. 5.

The configuration for the repeating operation may include a feedback configuration. The feedback configuration may indicate resources for the repeater node 610 to use for transmitting feedback communications, configurations for transmit parameters associated with transmitting feedback communications (e.g., transmit power, beamforming configuration, and/or the like) for the repeater node 610 to use when transmitting feedback communications, and/or the like. In some aspects, the feedback configuration may indicate a type of feedback (e.g., acknowledgement or negative acknowledgment (ACK/NACK) feedback, a measurement report, and/or the like) that is to be provided by the repeater node 610. In some aspects, the feedback configuration may indicate a measurement configuration associated with performing measurements of communications that are to be forwarded by the repeater node 610. The measurement configuration may indicate beams, signals, reference signals, and/or the like that the repeater node is to measure to determine a channel condition value associated with a received communication.

In some aspects, the feedback configuration may be provided with the configuration for the repeating operation. In some aspects, the feedback configuration may be provided separately from the configuration for the repeating operation. The control node 605 may transmit the feedback configuration semi-statically and/or dynamically. The feedback configuration may be carried using an RRC message, DCI, a MAC-CE, and/or the like.

As shown by reference number 625, the control node 605 may transmit, and the repeater node 610 may receive, a signal of a communication. Alternatively, the wireless node 615 may transmit the signal of the communication to the repeater node 610. The communication may be associated with a digital repeating operation. That is, the repeater node 610 may be configured and/or scheduled to forward the communication (e.g., to the control node 605, to the wireless node 615, and/or the like).

In some aspects, the communication may be a PDCCH communication, a PDSCH communication, a PUCCH communication, a PUSCH communication, a physical sidelink channel communication, and/or the like.

As shown by reference number 630, the repeater node 610 may perform a measurement associated with the communication. The repeater node 610 may perform the measurement associated with the signal of the communication in accordance with the feedback configuration received from the control node 605. For example, the repeater node 610 may determine a channel condition value associated with the signal of the communication. The channel condition value may include a measured received power value, a measured received quality value, a signal-to-noise ratio (SNR) value, and/or the like. In some aspects, the repeater node 610 may measure the signal of the communication to determine the channel condition value. In some aspects, the repeater node 610 may measure a reference signal (e.g., a synchronization signal block (SSB), a channel state information (CSI) reference signal (CSI-RS), a DMRS, a phase tracking reference signal (PTRS), a sounding reference signal (SRS), and/or the like) associated with (e.g., included in) the communication. For example, the channel condition value may include a channel quality indicator (CQI) value, a CSI-RS resource indicator (CRI) value, an RSRP value, an RSSI value, an RSRQ value, an SNR value, a signal to interference plus noise ratio (SINR) value, and/or the like.

In some aspects, the repeater node 610 may determine whether to provide feedback for the communications based at least in part on the measurement associated with the communication. In some aspects, for example, the repeater node 610 may not provide feedback to the control node 605 if a channel condition value of the communication satisfies a threshold.

As shown by reference number 635, the repeater node 610 may transmit, and the control node 605 may receive, a feedback communication associated with the communication that is to be forwarded by the repeater node 610. The feedback communication may be based at least in part on the measurement associated with the communication. For example, the feedback communication may be ACK/NACK feedback indicating a quality of the communication. That is, the feedback communication may be ACK feedback if a channel condition value of the communication satisfies a threshold or NACK feedback if a channel condition value of the communication does not satisfy a threshold.

In some aspects, the feedback communication may include a measurement report. The measurement report may indicate one or more channel condition values associated with the communication. In some aspects, the repeater node 610 may transmit the measurement report to the control node 605 based at least in part on the channel condition value. For example, the repeater node 610 may transmit the measurement report to the control node 605 if the channel condition value does not satisfy a threshold. The repeater node 610 may not transmit the measurement report to the control node 605 if the channel condition value does satisfy the threshold. In this way, the repeater node 610 may conserve resources that would have otherwise been used transmitting the measurement report to control node 605 when the channel condition value satisfied the threshold (e.g., when the signal of the communication has a good quality or power).

In some aspects, the repeater node 610 may transmit the feedback communication before forwarding the communication in accordance with the repeating operation (e.g., as shown in FIG. 6). In some aspects, the repeater node 610 may transmit the feedback communication after forwarding the communication in accordance with the repeating operation (e.g., after the operations explained below with respect to reference number 655).

In some aspects, the repeater node 610 may transmit the feedback communication to the control node 605 and one or more other wireless nodes 615. For example, if the control node 605 did not transmit the communication, the repeater node 610 may transmit the feedback communication to the control node 605 and the wireless node 615 that transmitted the communication.

The control node 605 may receive the feedback communication from the repeater node 610 and may use the feedback communication to make improved configuration and/or scheduling decisions for the repeater node 610. As shown by reference number 640, the control node 605 may determine an updated configuration for the repeating operation based at least in part on the feedback communication. For example, the control node 605 may determine that the repeater node 610 should not forward the communication (e.g., based at least in part on receiving NACK feedback from the repeater node 610, based at least in part on receiving an indication of a channel condition value that does not satisfy a threshold from the repeater node 610, and/or the like). The control node 605 may transmit an indication to the repeater node 610 to not forward the received communication. Instead, the control node 605 may cause the communication to be retransmitted to the repeater node 610 (e.g., the control node 605 may retransmit the communication to the repeater node 610, the control node 605 may instruct the wireless node 615 that originally transmitted the communication to retransmit the communication to the repeater node 610, and/or the like). In some aspects, the control node 605 may cause the communication to be retransmitted using a different transmit configuration (e.g., using a different transmit power, a different transmit beam, a different rate, and/or the like) to accommodate to the channel conditions indicated by the feedback communication.

In some aspects, the control node 605 may determine an updated configuration for the repeating operation to be performed by the repeater node 610 based at least in part on the feedback communication. For example, the control node 605 may determine an updated transmit configuration for the repeater node 610 to use when forwarding the communication, an updated transmit power for the repeater node 610 to use when forwarding the communication, an updated beamforming setting for the repeater node 610 to use when forwarding the communication, and/or the like. In some aspects, the control node 605 may determine that the repeating operation should include one or more repetitions of the forwarded communication (e.g., that the repeater node 610 should transmit the regenerated signal of the communication in one or more repetitions).

In some aspects, the control node 605 may determine the updated configuration for the repeating operation for upcoming communications based at least in part on the feedback communication. For example, the control node 605 may determine an updated configuration or scheduling information for the repeating operation that is to be used by the repeater node 610 for future communications.

In some aspects, the control node 605 may utilize the feedback communication when the communication that is to be forwarded by the repeater node 610 is a semi-static communication that is not accompanied by a dynamic PDCCH communication from the control node 605 to the repeater node 610. For example, the control node 605 may transmit an initial PDCCH communication to the repeater node 610 indicating that the repeater node 610 is to forward a communication to a destination node (e.g., a wireless node 615, the control node 605, and/or the like) according to a semi-static schedule. The future communications to be forwarded by the repeater node 610 to the destination node that follow the semi-static schedule may not be triggered or accompanied by a PDCCH communication from the control node 605 to the repeater node 610. As a result, the feedback communication may enable the control node 605 to evaluate channel conditions associated with the future communications to make improved configuration and/or scheduling decisions for the repeater node 610.

In some aspects, the control node 605 may utilize the feedback communication when the communication that is to be forwarded by the repeater node 610 is a periodic communication that is to be stored by the repeater node 610. For example, the control node 605 may instruct the repeater node 610 to receive a communication, digitally process the communication (e.g., following one or more of the digital processing options described above with respect to FIG. 5), store the digitally processed communication, and transmit the regenerated signal of the communication in accordance with a periodic schedule. In some aspects, the communication received by the repeater node 610 may be associated with poor channel conditions. As a result, the feedback communication may enable the control node 605 to cause the stored signal to be replaced (e.g., overwritten) with a new signal associated with the communication (e.g., the control node 605 may retransmit a new signal to replace the stored signal, the control node 605 may instruct a wireless node 615 to retransmit a new signal to replace the stored signal, and/or the like). Therefore, the feedback communication may improve performance of such periodic communications to be forwarded by the repeater node 610 by ensuring that the repeater node 610 does not store signals associated with poor channel conditions.

In some aspects, the control node 605 may utilize the feedback communication to select a repeater node 610 from a plurality of repeater nodes 610. For example, the communication may be transmitted to a plurality of candidate repeater nodes 610. Each candidate repeater node 610 may transmit, to the control node 605, a feedback communication indicating a quality or power of the signal as received by the candidate repeater node 610. The control node 605 may use the feedback communications to select a candidate repeater node 610 that indicates a highest channel condition value in the feedback communication. In some aspects, the control node 605 may use the feedback communications to select a candidate repeater node 610 from one or more candidate repeater nodes 610 that provide ACK feedback.

As shown by reference number 645, the control node 605 may transmit, and the repeater node 610 may receive, the updated configuration for the repeating operation that is based at least in part on the feedback communication. As described above, in some aspects, the control node 605 may transmit to the repeater node 610 an indication to proceed or an indication to not proceed with forwarding the communication. In some aspects, the control node 605 may transmit to the repeater node 610 an indication of an updated configuration that is to be used by the repeater node 610 when forwarding the communication. In some aspects, the control node 605 may transmit to the repeater node 610 an indication of an updated configuration that is to be used by the repeater node 610 when forwarding future communications. In some aspects, the control node 605 may transmit to the repeater node 610 an indication that the repeater node 610 has been selected from one or more other candidate repeater nodes 610 to forward the communication.

As shown by reference number 650, the repeater node 610 may perform a digital processing operation to regenerate a signal of the communication (e.g., as described above with respect to FIG. 5). As shown by reference number 655, the repeater node 610 may transmit, and the wireless node 615 may receive, the regenerated signal of the communication. Alternatively, the repeater node 610 may transmit the regenerated signal of the communication to the control node 605.

As a result, the control node 605 may be enabled to determine a channel condition associated with the communication as the communication was received by the repeater node 610. The feedback communication enables the control node 605 to make improved configuration and/or scheduling decisions for the repeater node 610. As a result, network performance is improved as the control node 605 may ensure that the repeater node 610 is scheduled and/or configured to forward communications based at least in part on feedback associated with the communications.

As indicated above, FIG. 6 is provided as an example. Other examples may differ from what is described with respect to FIG. 6.

Figure 7:
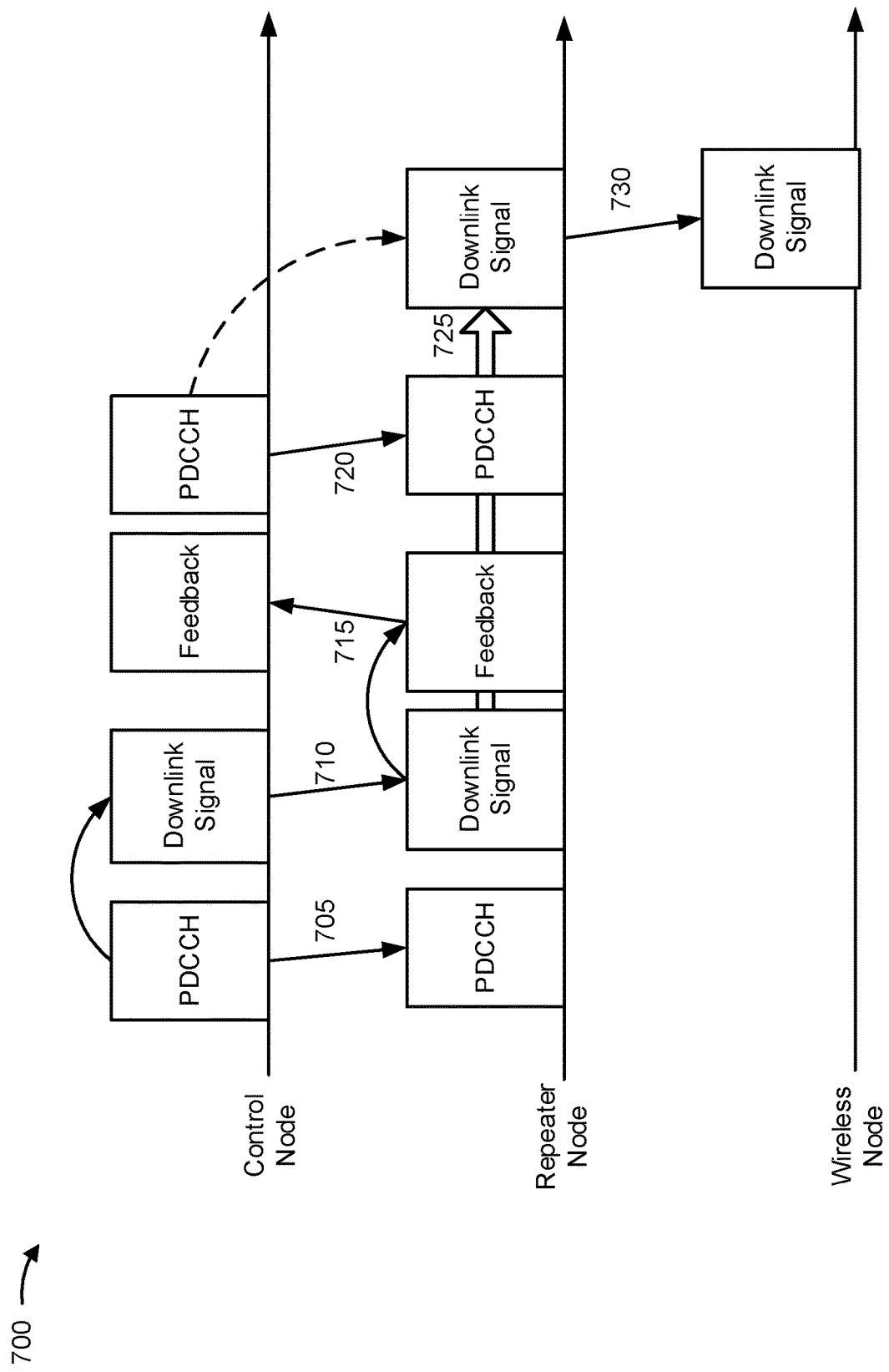

FIG. 7 is a diagram illustrating an example 700 associated with feedback reporting by a repeater, in accordance with the present disclosure. As shown in FIG. 7, a control node, a repeater node, and one or more wireless nodes may communicate with one another in a wireless network (e.g., wireless network 100). In some aspects, the control node may be the control node 605, the control node 510, the control node 410, the first wireless node 305, the second wireless node 315, and/or the like. In some aspects, the repeater node may be the repeater node 610, the repeater node 505, the repeater node 405, the repeater node 310, and/or the like. In some aspects, the wireless node may be the wireless node 615, the wireless node 515, the wireless node 415, the first wireless node 305, the second wireless node 315, and/or the like.

FIG. 7 depicts a situation in which the control node is transmitting a downlink signal to be forwarded by the repeater node in accordance with a repeating operation. In some aspects, the downlink signal may be transmitted by another wireless node that is aware of the repeater node (e.g., the repeater node may be controlled by a third device not shown in FIG. 7).

As shown by reference number 705, the control node may transmit a PDCCH communication. The PDCCH communication may be a fronthaul PDCCH communication (e.g., a PDCCH communication sent using a fronthaul link). The PDCCH communication may schedule a downlink signal (e.g., a fronthaul downlink signal) that is to be forwarded by the repeater node. In some aspects, the PDCCH communication may indicate a configuration for the repeating operation that is to be performed by the repeater node (e.g., may indicate resources, a transmit configuration, a beamforming configuration, and/or the like associated with the repeating operation). In some aspects, the PDCCH communication may indicate a feedback configuration indicating how the repeater node is to provide feedback to the control node.

As shown by reference number 710, the control node (or another wireless node) may transmit, and the repeater node may receive, the downlink signal that is to be forwarded by the repeater node. The repeater node may perform a measurement associated with the received downlink signal. For example, the repeater node may determine one or more channel condition values associated with the received downlink signal.

As shown by reference number 715, the repeater node may transmit, and the control node may receive, a feedback communication associated with the downlink signal. The feedback communication may be ACK/NACK feedback indicating a channel condition associated with the received downlink signal. In some aspects, the feedback communication may include a measurement report indicating at least one of a measured received power, a measured received quality, or one or more channel condition values associated with the received downlink signal. In some aspects, the repeater node may transmit the feedback communication before forwarding the downlink signal to the wireless node (e.g., as shown in FIG. 7). In some aspects, the repeater node may transmit the feedback communication after forwarding the downlink signal to the wireless node (e.g., after the operations described below with respect to reference number 730).

As shown by reference number 720, the control node may transmit a PDCCH communication that is based at least in part on the feedback communication. For example, the PDCCH communication may indicate to the repeater node to proceed or to not proceed with forwarding the downlink signal to the wireless node. In some aspects, the PDCCH communication may indicate an updated configuration for the repeating operation (e.g., an updated configuration that the repeater node is to use when transmitting the regenerated downlink signal to the wireless node, an updated configuration that the repeater node is to use for future communications, and/or the like). In some aspects, the PDCCH communication may schedule and/or configure the transmission of a regenerated signal of the downlink signal by the repeater node. In some aspects, the control node may not transmit a PDCCH communication after receiving the feedback communication. For example, if the feedback communication indicates that the received downlink signal is associated with good channel conditions (e.g., ACK feedback and/or the like), the control node may not transmit a PDCCH communication and the repeater node may continue with the repeating operation as normal.

As shown by reference number 725, the repeater node may regenerate the received downlink signal using a digital processing operation (e.g., one or more of the digital processing operations described above with respect to FIG. 5). In some aspects, the repeater node may regenerate the received downlink signal based at least in part on the PDCCH communication (e.g., that is based at least in part on the feedback communication) received from the control node (e.g., as shown by the dashed line in FIG. 7). As shown by reference number 730, the repeater node may transmit the regenerated downlink signal to the wireless node in accordance with the repeating operation.

As indicated above, FIG. 7 is provided as an example. Other examples may differ from what is described with respect to FIG. 7.

Figure 8:
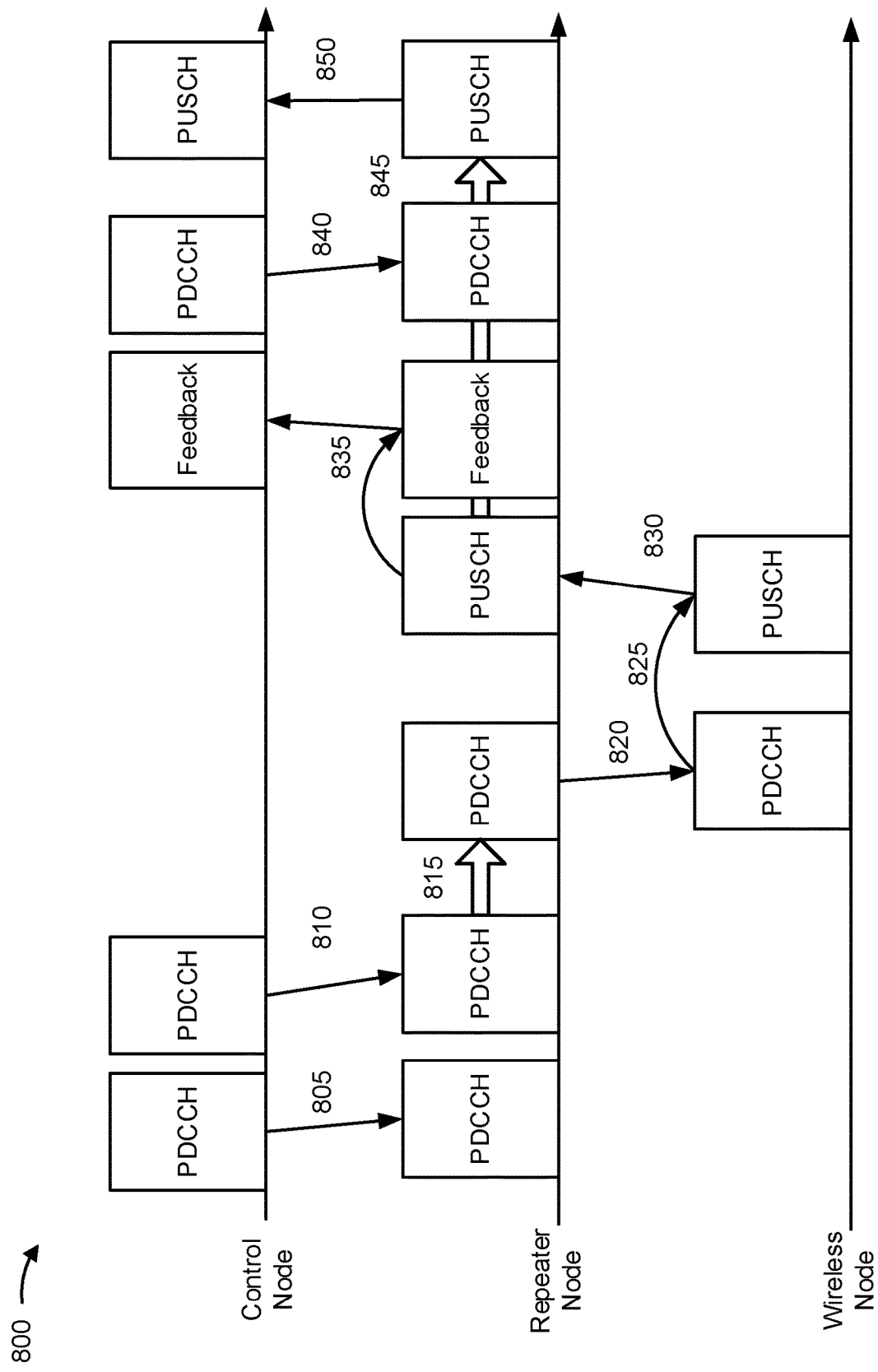

FIG. 8 is a diagram illustrating an example 800 associated with feedback reporting by a repeater, in accordance with the present disclosure. As shown in FIG. 8, a control node, a repeater node, and one or more wireless nodes may communicate with one another in a wireless network (e.g., wireless network 100). In some aspects, the control node may be the control node 605, the control node 510, the control node 410, the first wireless node 305, the second wireless node 315, and/or the like. In some aspects, the repeater node may be the repeater node 610, the repeater node 505, the repeater node 405, the repeater node 310, and/or the like. In some aspects, the wireless node may be the wireless node 615, the wireless node 515, the wireless node 415, the first wireless node 305, the second wireless node 315, and/or the like.

FIG. 8 depicts a situation in which the wireless node is transmitting an uplink signal to be forwarded by the repeater node to the control node (or another wireless node) in accordance with a repeating operation.

As shown by reference number 805, the control node may transmit a first PDCCH communication. The first PDCCH communication may be a fronthaul PDCCH communication (e.g., a PDCCH communication sent using a fronthaul link). The first PDCCH communication may schedule a downlink control signal that is to be forwarded by the repeater node to the wireless node to schedule an uplink signal. In some aspects, the first PDCCH communication may indicate a configuration for the repeating operation that is to be performed by the repeater node (e.g., may indicate resources, a transmit configuration, a beamforming configuration, and/or the like associated with the repeating operation). In some aspects, the first PDCCH communication may indicate a feedback configuration indicating how the repeater node is to provide feedback to the control node.

As shown by reference number 810, the first wireless node may transmit a second PDCCH communication (e.g., or a PDSCH communication) to the repeater node. In some aspects, the second PDCCH communication may be a control communication that is to be regenerated and forwarded by the repeater node to the wireless node (e.g., the second PDCCH communication may indicate a scheduling grant, a resource allocation for an uplink transmission, and/or the like). The second PDCCH communication may include a configuration indicating how the repeater node is to transmit a regenerated PDCCH communication to the wireless node (e.g., a resource allocation, a beamforming configuration, and/or the like). In some aspects, the second PDCCH communication may include a configuration indicating how the repeater node is to receive the uplink communication from the wireless node (e.g., a resource allocation, a beamforming configuration, and/or the like). In some aspects, the repeater node may transmit a feedback communication based at least in part on the received second PDCCH communication (e.g., in a similar manner as described above with respect to FIG. 7). In some aspects, the first PDCCH communication and the second PDCCH communication may be the same communication.

As shown by reference number 815, the repeater node may regenerate the second PDCCH communication using a digital processing operation (e.g., one or more of the digital processing operations described above with respect to FIG. 5). As shown by reference number 820, the repeater node may transmit the regenerated second PDCCH to the wireless node.

As shown by reference number 825, the regenerated second PDCCH communication may schedule an uplink signal (e.g., a PUSCH communication, a PUCCH communication, and/or the like) to be transmitted by the wireless node.

As shown by reference number 830, the wireless node may transmit, and the repeater node may receive, the uplink signal. In some aspects, the second wireless node may not transmit the uplink signal to the repeater node (e.g., the wireless node may be unaware of the repeater node and may simply be attempting to transmit the uplink signal to the control node or another wireless node). The repeater node may receive the uplink signal based at least in part on the configuration indicated by the control node.

As shown by reference number 835, the repeater node may transmit, and the control node may receive, a feedback communication associated with the uplink signal. The feedback communication may be ACK/NACK feedback indicating a channel condition associated with the received uplink signal. In some aspects, the feedback communication may include a measurement report indicating at least one of a measured received power, a measured received quality, or one or more channel condition values associated with the received uplink signal. In some aspects, the repeater node may transmit the feedback communication before forwarding the uplink signal to the control node or another wireless node (e.g., as shown in FIG. 7). In some aspects, the repeater node may transmit the feedback communication after forwarding the uplink signal to the control node or the other wireless node (e.g., after the operation described below with respect to reference number 850).

As shown by reference number 840, the control node may transmit a PDCCH communication that is based at least in part on the feedback communication. For example, the PDCCH communication may indicate to the repeater node to proceed or to not proceed with forwarding the uplink signal. In some aspects, the PDCCH communication may indicate an updated configuration for the repeating operation (e.g., an updated configuration that the repeater node is to use when transmitting the regenerated uplink signal, an updated configuration that the repeater node is to use for future communications, and/or the like). In some aspects, the PDCCH communication may schedule and/or configure the transmission of a regenerated uplink signal by the repeater node. In some aspects, the control node may not transmit a PDCCH communication after receiving the feedback communication. For example, if the feedback communication indicates that the received uplink signal is associated with good channel conditions (e.g., ACK feedback and/or the like), the control node may not transmit a PDCCH communication and the repeater node may continue with the repeating operation as normal.

As shown by reference number 845, the repeater node may regenerate the received uplink signal using a digital processing operation (e.g., one or more of the digital processing operations described above with respect to FIG. 5). In some aspects, the repeater node may regenerate the received uplink signal based at least in part on the PDCCH communication (e.g., that is based at least in part on the feedback communication) received from the control node. As shown by reference number 850, the repeater node may transmit the regenerated uplink signal to the control node (or another wireless node) in accordance with the repeating operation.

As indicated above, FIG. 8 is provided as an example. Other examples may differ from what is described with respect to FIG. 8.

Figure 9:
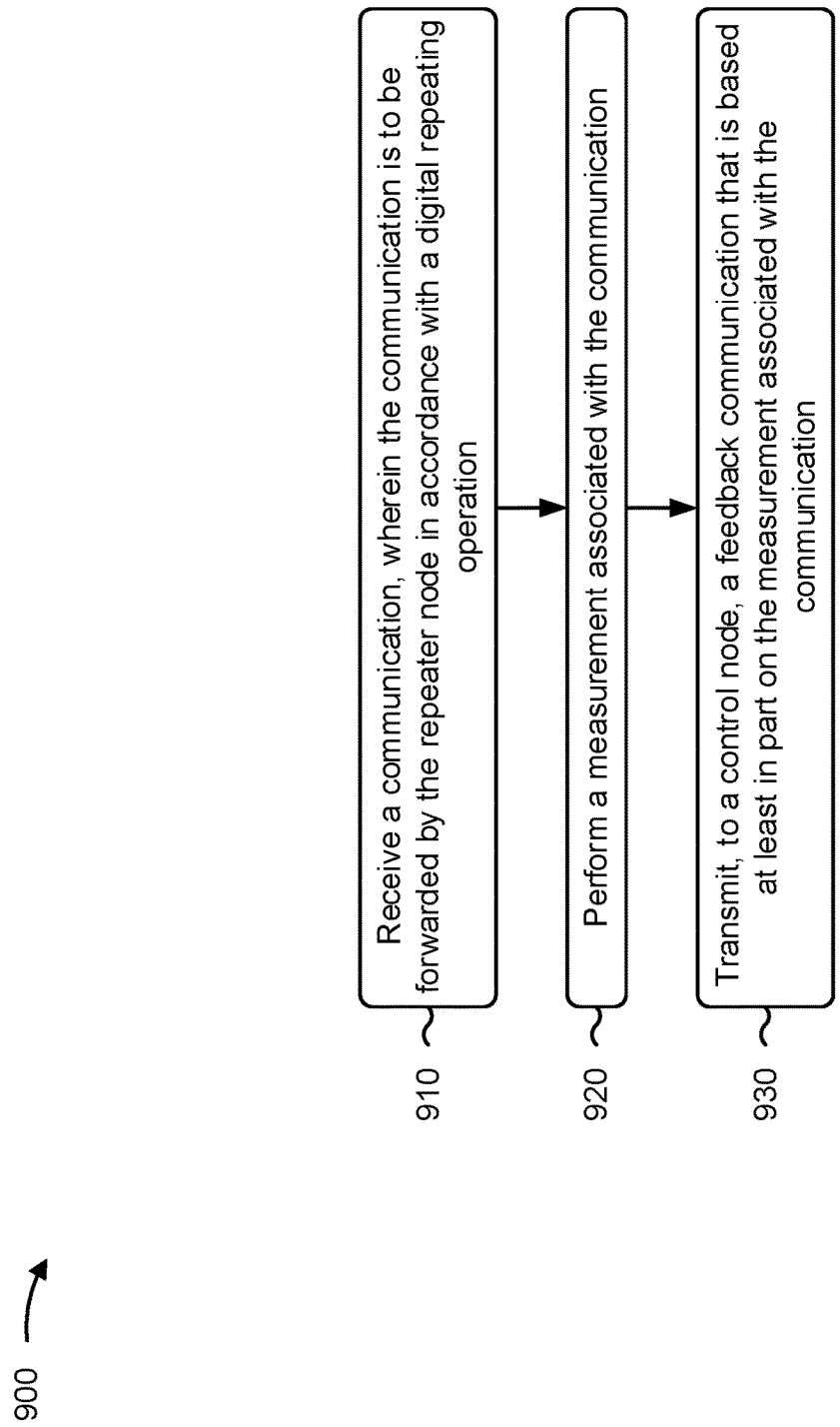
FIGS. 9-10 are diagrams illustrating example processes associated with feedback reporting by a repeater, in accordance with the present disclosure.

FIG. 9 is a diagram illustrating an example process 900 performed, for example, by a repeater node, in accordance with the present disclosure. Example process 900 is an example where the repeater node (e.g., repeater node 310, repeater node 405, repeater node 505, repeater node 610) performs operations associated with feedback reporting by a repeater.

As shown in FIG. 9, in some aspects, process 900 may include receiving a communication, wherein the communication is to be forwarded in accordance with a digital repeating operation (block 910). For example, the repeater node (e.g., using reception component 1102, depicted in FIG. 11) may receive a communication, wherein the communication is to be forwarded by the repeater node in accordance with a digital repeating operation, as described above.

As further shown in FIG. 9, in some aspects, process 900 may include performing a measurement associated with the communication (block 920). For example, the repeater node (e.g., using measurement component 1108, depicted in FIG. 11) may perform a measurement associated with the communication, as described above.

As further shown in FIG. 9, in some aspects, process 900 may include transmitting, to a control node, a feedback communication that is based at least in part on the measurement associated with the communication (block 930). For example, the repeater node (e.g., using transmission component 1104, depicted in FIG. 11) may transmit, to a control node, a feedback communication that is based at least in part on the measurement associated with the communication, as described above.

Process 900 may include additional aspects, such as any single aspect or any combination of aspects described below and/or in connection with one or more other processes described elsewhere herein.

In a first aspect, receiving the communication comprises receiving (e.g., using reception component 1102, depicted in FIG. 11), from the control node, the communication.

In a second aspect, alone or in combination with the first aspect, process 900 includes forwarding (e.g., using transmission component 1104, depicted in FIG. 11), to the control node, the communication, in accordance with the digital repeating operation.

In a third aspect, alone or in combination with one or more of the first and second aspects, process 900 includes digitally processing (e.g., using signal processing component 1110, depicted in FIG. 11), in accordance with the digital repeating operation, the communication, to regenerate a signal associated with the communication, and transmitting the regenerated signal associated with the communication.

In a fourth aspect, alone or in combination with one or more of the first through third aspects, transmitting, to the control node, the feedback communication comprises transmitting (e.g., using transmission component 1104, depicted in FIG. 11) the feedback communication before the transmission of the regenerated signal associated with the communication.

In a fifth aspect, alone or in combination with one or more of the first through fourth aspects, transmitting, to the control node, the feedback communication comprises transmitting (e.g., using transmission component 1104, depicted in FIG. 11) the feedback communication after the transmission of the regenerated signal associated with the communication.

In a sixth aspect, alone or in combination with one or more of the first through fifth aspects, the feedback communication is a function of the measurement associated with the communication.

In a seventh aspect, alone or in combination with one or more of the first through sixth aspects, performing the measurement associated with the communication comprises performing a measurement (e.g., using measurement component 1108, depicted in FIG. 11) of a reference signal associated with the communication.

In an eighth aspect, alone or in combination with one or more of the first through seventh aspects, the feedback communication comprises acknowledgment or negative acknowledgement feedback.

In a ninth aspect, alone or in combination with one or more of the first through eighth aspects, process 900 includes determining (e.g., using determination component 1112, depicted in FIG. 11) a channel condition value associated with the communication based at least in part on performing the measurement associated with the communication.

In a tenth aspect, alone or in combination with one or more of the first through ninth aspects, transmitting, to the control node, the feedback communication comprises determining (e.g., using determination component 1112, depicted in FIG. 11) whether the channel condition value satisfies a threshold, and transmitting (e.g., using transmission component 1104, depicted in FIG. 11), to the control node, acknowledgment or negative acknowledgement feedback based at least in part on the determination of whether the channel condition value satisfies the threshold.

In an eleventh aspect, alone or in combination with one or more of the first through tenth aspects, the feedback communication comprises a measurement report indicating at least one of a measured received power, a measured received quality, or a channel condition value.

In a twelfth aspect, alone or in combination with one or more of the first through eleventh aspects, process 900 includes determining (e.g., using determination component 1112, depicted in FIG. 11) whether the channel condition value satisfies a threshold, and transmitting (e.g., using transmission component 1104, depicted in FIG. 11) a measurement report indicating the channel condition value based at least in part on a determination that the channel condition value does not satisfy the threshold.

In a thirteenth aspect, alone or in combination with one or more of the first through twelfth aspects, process 900 includes receiving (e.g., using reception component 1102, depicted in FIG. 11), from the control node, an indication of whether to forward the communication, and the indication is based at least in part on the feedback communication.

In a fourteenth aspect, alone or in combination with one or more of the first through thirteenth aspects, receiving, from the control node, the indication of whether to forward the communication comprises receiving (e.g., using reception component 1102, depicted in FIG. 11) an indication to not forward to the communication, and process 900 comprising receiving (e.g., using reception component 1102, depicted in FIG. 11) another communication indicating information that is the same as information indicated by the communication.

In a fifteenth aspect, alone or in combination with one or more of the first through fourteenth aspects, the other communication is transmitted using a different transmit configuration than a transmit configuration used to transmit the communication.

In a sixteenth aspect, alone or in combination with one or more of the first through fifteenth aspects, process 900 includes receiving (e.g., using reception component 1102, depicted in FIG. 11), from the control node, a configuration indicating a set of forwarding parameters, wherein the configuration is based at least in part on the feedback communication, and forwarding (e.g., using transmission component 1104, depicted in FIG. 11) the communication in accordance with the configuration.

In a seventeenth aspect, alone or in combination with one or more of the first through sixteenth aspects, the set of forwarding parameters includes at least one of a transmit power, a beamforming configuration, or a quantity of repetitions.

In an eighteenth aspect, alone or in combination with one or more of the first through seventeenth aspects, process 900 includes receiving (e.g., using reception component 1102, depicted in FIG. 11), from the control node, a configuration indicating a set of forwarding parameters for upcoming communications associated with the digital repeating operation, wherein the configuration is based at least in part on the feedback communication.

In a nineteenth aspect, alone or in combination with one or more of the first through eighteenth aspects, the communication is a semi-static communication.

In a twentieth aspect, alone or in combination with one or more of the first through nineteenth aspects, the communication is a periodic communication, and process 900 includes storing (e.g., using signal processing component 1110, depicted in FIG. 11) the communication, and forwarding (e.g., using transmission component 1104, depicted in FIG. 11) the stored communication in accordance with a periodic schedule associated with the communication.

In a twenty-first aspect, alone or in combination with one or more of the first through twentieth aspects, process 900 includes receiving (e.g., using reception component 1102, depicted in FIG. 11) an indication to replace the stored communication with a retransmitted communication, wherein the indication to replace the stored communication with the retransmitted communication is based at least in part on the feedback communication.

In a twenty-second aspect, alone or in combination with one or more of the first through twenty-first aspects, process 900 includes receiving (e.g., using reception component 1102, depicted in FIG. 11) an indication that the repeater node has been selected, from a plurality of repeater nodes, to forward the communication, wherein the indication is based at least in part on the feedback communication.

In a twenty-third aspect, alone or in combination with one or more of the first through twenty-second aspects, process 900 includes receiving (e.g., using reception component 1102, depicted in FIG. 11), from the control node, a configuration indicating a set of feedback parameters associated with transmitting feedback communications to the control node, and transmitting, to the control node, the feedback communication comprises transmitting (e.g., using transmission component 1104, depicted in FIG. 11) the feedback communication in accordance with the configuration.

In a twenty-fourth aspect, alone or in combination with one or more of the first through twenty-third aspects, process 900 includes transmitting (e.g., using transmission component 1104, depicted in FIG. 11), to one or more wireless nodes associated with the digital repeating operation, the feedback communication.

In a twenty-fifth aspect, alone or in combination with one or more of the first through twenty-fourth aspects, the communication is at least one of a physical downlink control channel communication, a physical downlink shared channel communication, a physical uplink control channel communication, a physical uplink shared channel communication, or a physical sidelink channel communication.

In a twenty-sixth aspect, alone or in combination with one or more of the first through twenty-fifth aspects, the communication is not fully decoded by the repeater node.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
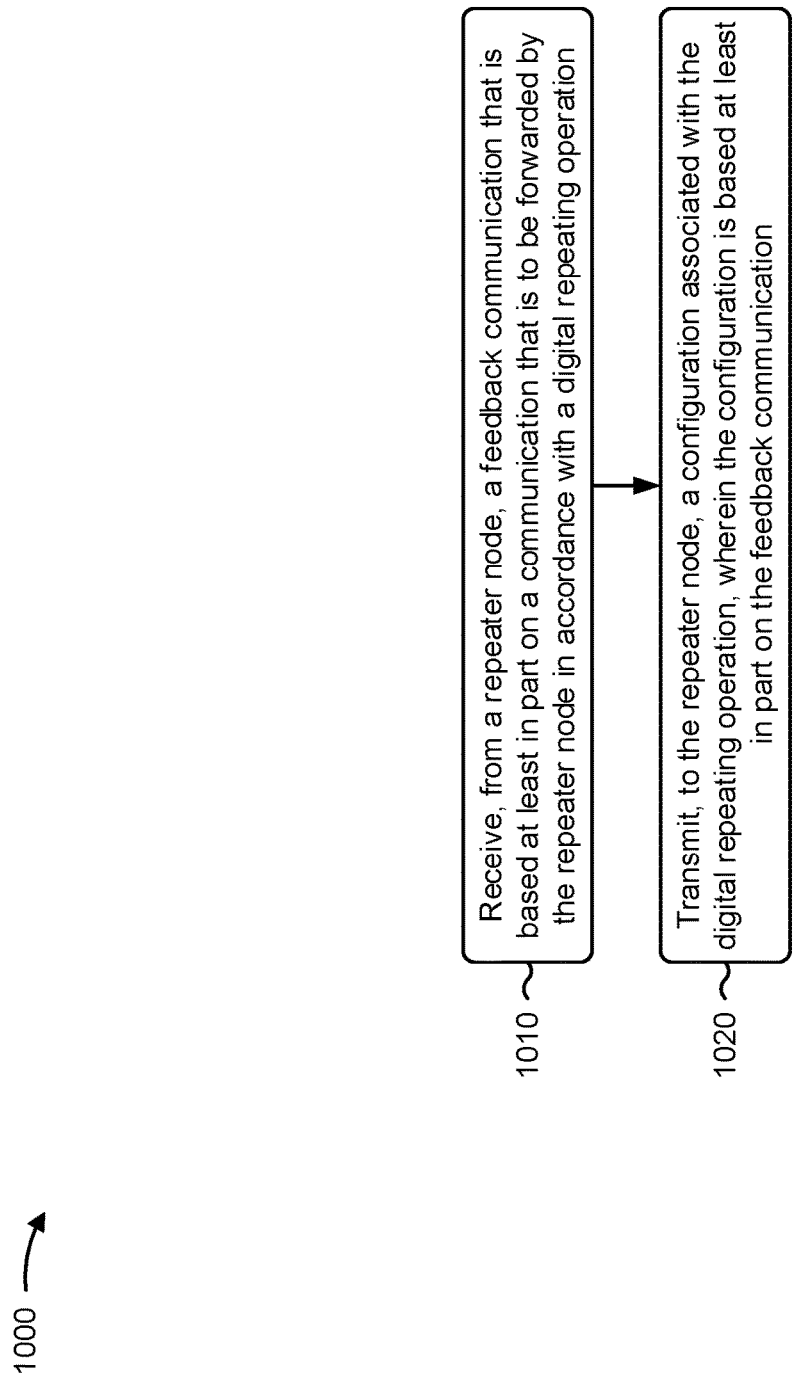

FIG. 10 is a diagram illustrating an example process 1000 performed, for example, by a control node, in accordance with the present disclosure. Example process 1000 is an example where the control node (e.g., control node 410, control node 510, control node 605, first wireless node 305, second wireless node 315, and/or the like) performs operations associated with feedback reporting by a repeater.

As shown in FIG. 10, in some aspects, process 1000 may include receiving, from a repeater node, a feedback communication that is based at least in part on a communication that is to be forwarded by the repeater node in accordance with a digital repeating operation (block 1010). For example, the control node (e.g., using reception component 1202, depicted in FIG. 12) may receive, from a repeater node, a feedback communication that is based at least in part on a communication that is to be forwarded by the repeater node in accordance with a digital repeating operation, as described above.

As further shown in FIG. 10, in some aspects, process 1000 may include transmitting, to the repeater node, a configuration associated with the digital repeating operation, wherein the configuration is based at least in part on the feedback communication (block 1020). For example, the control node (e.g., using transmission component 1204, depicted in FIG. 12) may transmit, to the repeater node, a configuration associated with the digital repeating operation, wherein the configuration is based at least in part on the feedback communication, as described above.

Process 1000 may include additional aspects, such as any single aspect or any combination of aspects described below and/or in connection with one or more other processes described elsewhere herein.

In a first aspect, process 1000 includes transmitting (e.g., using transmission component 1204, depicted in FIG. 12), to the repeater node, the communication that is to be forwarded by the repeater node in accordance with a digital repeating operation.

In a second aspect, alone or in combination with the first aspect, the digital repeating operation includes the repeater node forwarding a regenerated signal associated with communication based at least in part on a digital processing operation performed by the repeater node.

In a third aspect, alone or in combination with one or more of the first and second aspects, process 1000 includes transmitting (e.g., using transmission component 1204, depicted in FIG. 12), to the repeater node, the communication that is to be forwarded by the repeater node.

In a fourth aspect, alone or in combination with one or more of the first through third aspects, process 1000 includes receiving (e.g., using reception component 1202, depicted in FIG. 12), from the repeater node, a regenerated signal associated with the communication in accordance with the digital repeating operation.

In a fifth aspect, alone or in combination with one or more of the first through fourth aspects, receiving, from the repeater node, the feedback communication comprises receiving (e.g., using reception component 1202, depicted in FIG. 12) the feedback communication before the repeater node forwards the communication.

In a sixth aspect, alone or in combination with one or more of the first through fifth aspects, receiving, from the repeater node, the feedback communication comprises receiving (e.g., using reception component 1202, depicted in FIG. 12) the feedback communication after the repeater node forwards the communication.

In a seventh aspect, alone or in combination with one or more of the first through sixth aspects, receiving, from the repeater node, the feedback communication comprises receiving (e.g., using reception component 1202, depicted in FIG. 12), from the repeater node, acknowledgement or negative acknowledgement feedback associated with the communication that is to be forwarded by the repeater node.

In an eighth aspect, alone or in combination with one or more of the first through seventh aspects, the acknowledgement or negative acknowledgement feedback indicates whether a channel condition value associated with the communication that is to be forwarded by the repeater node satisfies a threshold.

In a ninth aspect, alone or in combination with one or more of the first through eighth aspects, the feedback communication comprises a measurement report indicating at least one of a measured received power, a measured received quality, or a channel condition value associated with the communication that is to be forwarded by the repeater node.

In a tenth aspect, alone or in combination with one or more of the first through ninth aspects, the measurement report indicates that the channel condition value associated with the communication that is to be forwarded by the repeater node does not satisfy a threshold.

In an eleventh aspect, alone or in combination with one or more of the first through tenth aspects, process 1000 includes determining (e.g., using determination component 1208, depicted in FIG. 12) whether the repeater node is to forward the communication based at least in part on the feedback communication.

In a twelfth aspect, alone or in combination with one or more of the first through eleventh aspects, process 1000 includes transmitting (e.g., using transmission component 1204, depicted in FIG. 12), to the repeater node, an indication of whether the repeater node is to forward the communication.

Figure 12:
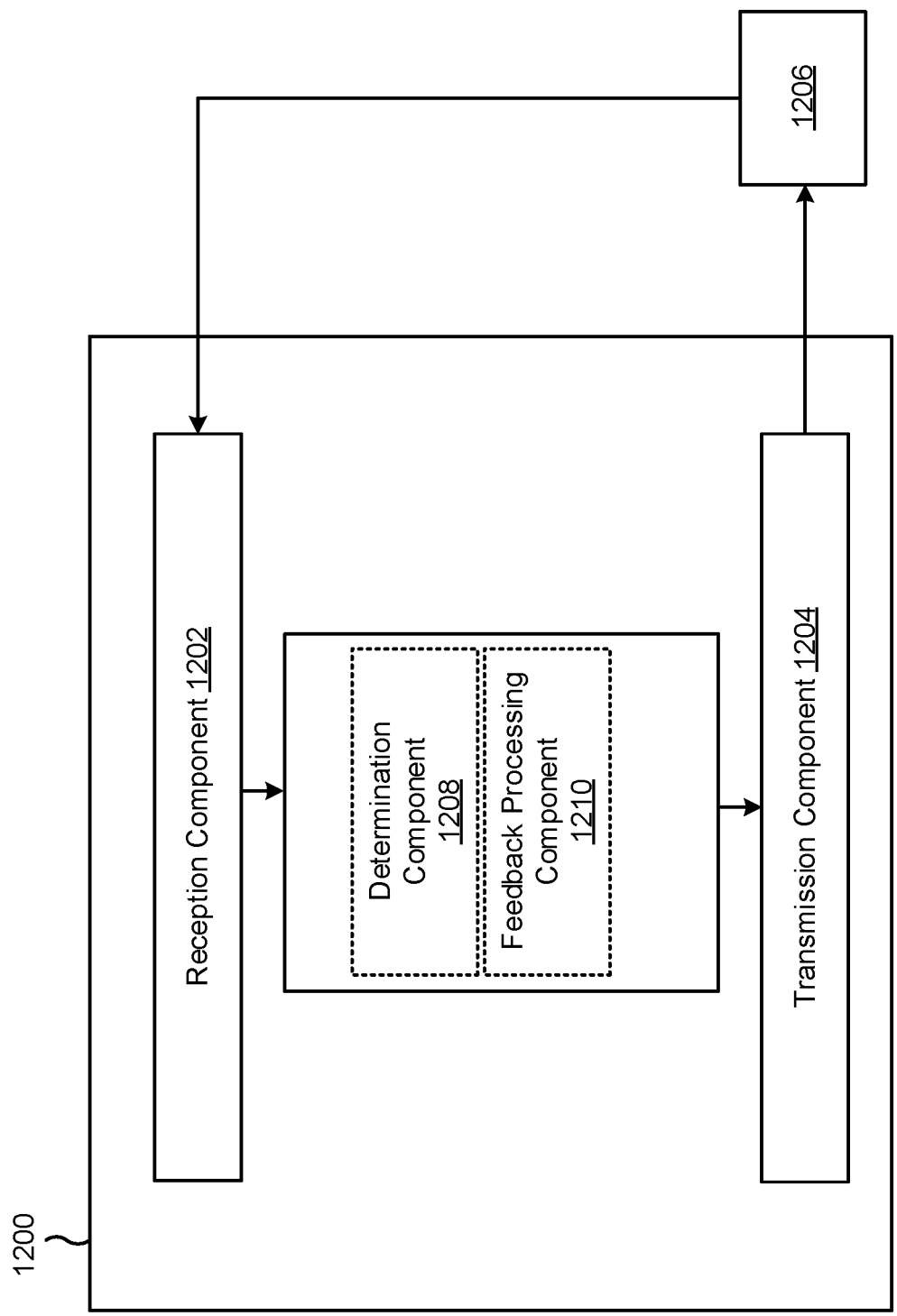

In a thirteenth aspect, alone or in combination with one or more of the first through twelfth aspects, determining whether the repeater node is to forward the communication based at least in part on the feedback communication comprises determining (e.g., using determination component 1208, depicted in FIG. 12) that the repeater node is not to forward the communication based at least in part on the feedback communication, and causing (e.g., using feedback processing component 1210 and/or transmission component 1204, depicted in FIG. 12) the communication to be retransmitted to the repeater node based at least in part on the determination that the repeater node is not to forward the communication.

In a fourteenth aspect, alone or in combination with one or more of the first through thirteenth aspects, causing the communication to be retransmitted to the repeater node comprises causing (e.g., using feedback processing component 1210 and/or transmission component 1204, depicted in FIG. 12) the communication to be retransmitted using a different transmit configuration than a transmit configuration that was used to transmit the communication to the repeater node.

In a fifteenth aspect, alone or in combination with one or more of the first through fourteenth aspects, process 1000 includes determining (e.g., using determination component 1208, depicted in FIG. 12) a set of forwarding parameters, based at least in part on the feedback communication, for the repeater node to use when forwarding the communication, and transmitting (e.g., using transmission component 1204, depicted in FIG. 12), to the repeater node, a configuration indicating the set of forwarding parameters.

In a sixteenth aspect, alone or in combination with one or more of the first through fifteenth aspects, the set of forwarding parameters includes at least one of a transmit power, a beamforming configuration, or a quantity of repetitions.

In a seventeenth aspect, alone or in combination with one or more of the first through sixteenth aspects, process 1000 includes determining (e.g., using determination component 1208, depicted in FIG. 12) a set of forwarding parameters, based at least in part on the feedback communication, for the repeater node to use when forwarding upcoming communications, and transmitting (e.g., using transmission component 1204, depicted in FIG. 12), to the repeater node, a configuration indicating the set of forwarding parameters.

In an eighteenth aspect, alone or in combination with one or more of the first through seventeenth aspects, the communication that is to be forwarded by the repeater node is a semi-static communication.

In a nineteenth aspect, alone or in combination with one or more of the first through eighteenth aspects, the communication that is to be forwarded by the repeater node is a periodic communication that is to be stored by the repeater node.

In a twentieth aspect, alone or in combination with one or more of the first through nineteenth aspects, process 1000 includes determining (e.g., using determination component 1208, depicted in FIG. 12) whether the repeater node is to use the stored communication for forwarding upcoming periodic communications based at least in part on the feedback communication.

In a twenty-first aspect, alone or in combination with one or more of the first through twentieth aspects, process 1000 includes determining (e.g., using determination component 1208, depicted in FIG. 12) that the repeater node is not to use the stored communication for forwarding upcoming periodic communications based at least in part on the feedback communication, causing (e.g., using feedback processing component 1210 and/or transmission component 1204, depicted in FIG. 12) the communication to be retransmitted to the repeater node, and transmitting, to the repeater node, an indication to replace the stored communication with the retransmitted communication.

In a twenty-second aspect, alone or in combination with one or more of the first through twenty-first aspects, receiving, from the repeater node, the feedback communication comprises receiving (e.g., using reception component 1202, depicted in FIG. 12), from a plurality of repeater nodes, a plurality of feedback communications associated with the communication to be forwarded by the plurality of repeater nodes.

In a twenty-third aspect, alone or in combination with one or more of the first through twenty-second aspects, process 1000 includes comparing (e.g., using determination component 1208, depicted in FIG. 12) the plurality of feedback communications, determining (e.g., using determination component 1208, depicted in FIG. 12) that the repeater node is to forward the communication based at least in part on comparing the plurality of feedback communications, and transmitting, to the repeater node, an indication that the repeater node is to forward the communication.

In a twenty-fourth aspect, alone or in combination with one or more of the first through twenty-third aspects, process 1000 includes determining (e.g., using determination component 1208, depicted in FIG. 12) a set of feedback parameters associated with feedback communication transmissions by the repeater node, and transmitting (e.g., using transmission component 1204, depicted in FIG. 12), to the repeater node, a configuration indicating the set of feedback parameters.

In a twenty-fifth aspect, alone or in combination with one or more of the first through twenty-fourth aspects, the communication that is to be forwarded by the repeater node is at least one of a physical downlink control channel communication, a physical downlink shared channel communication, a physical uplink control channel communication, a physical uplink shared channel communication, or a physical sidelink channel communication.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
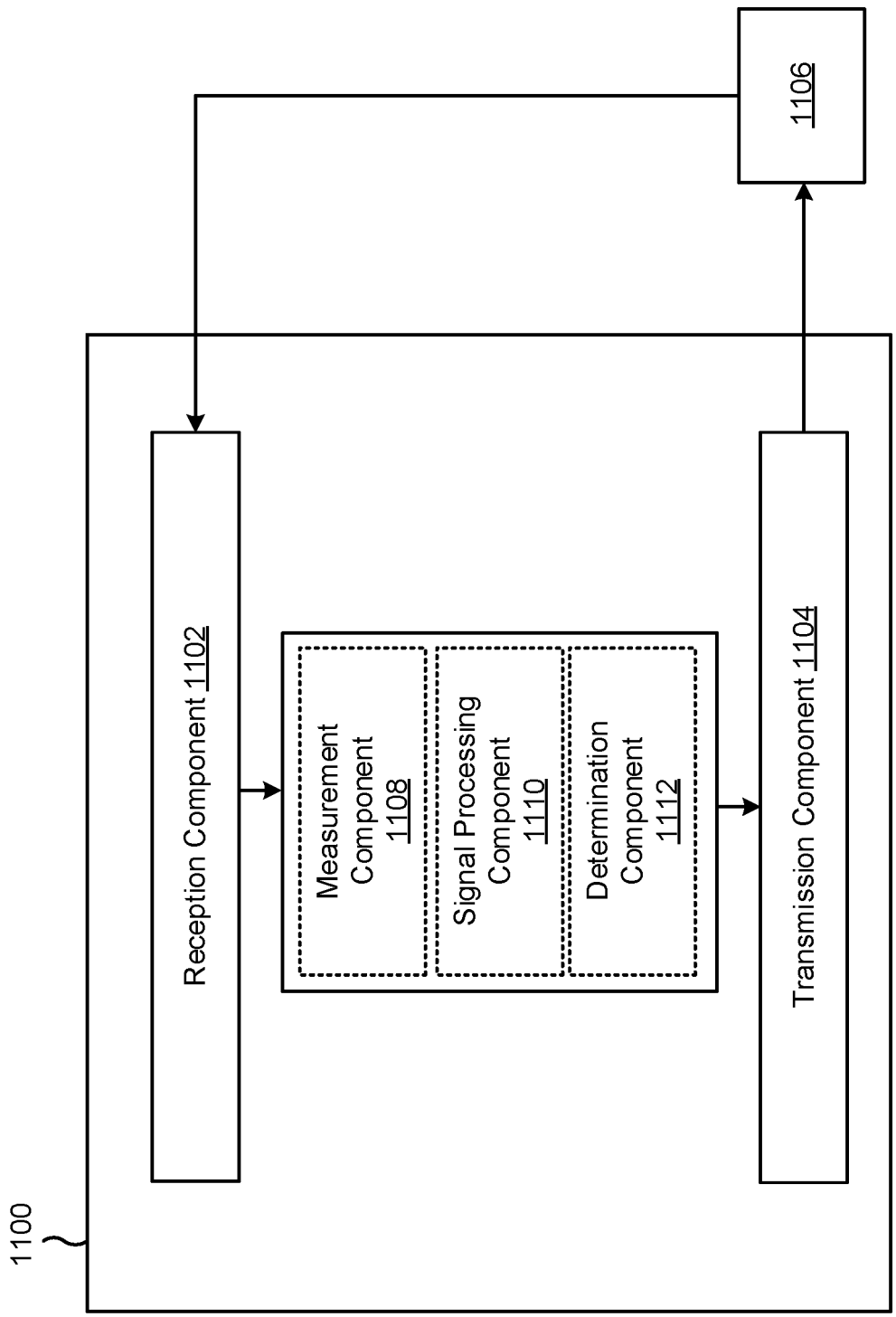
FIGS. 11-12 are block diagrams of example apparatuses for wireless communication, in accordance with the present disclosure.

FIG. 11 is a block diagram of an example apparatus 1100 for wireless communication. The apparatus 1100 may be a repeater node, or a repeater node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a measurement component 1108, a signal processing component 1110, or a determination component 1112, among other examples.

In some aspects, the apparatus 1100 may be configured to perform one or more operations described herein in connection with FIGS. 6-8. Additionally or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the repeater node described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the repeater node described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the repeater node described above in connection with FIG. 2. In some aspects, the transmission component 1104 may be co-located with the reception component 1102 in a transceiver.

The reception component 1102 may receive a communication, wherein the communication is to be forwarded by the repeater node in accordance with a digital repeating operation. The measurement component 1108 may perform a measurement associated with the communication. In some aspects, the measurement component 1108 may include one or more antennas, a demodulator, a MIMO detector, a receive processor, a modulator, a transmit MIMO processor, a transmit processor, a controller/processor, a memory, or a combination thereof, of the repeater node described above in connection with FIG. 2. The transmission component 1104 may transmit, to a control node, a feedback communication that is based at least in part on the measurement associated with the communication. The transmission component 1104 may forward, to the control node, the communication in accordance with the digital repeating operation.

The signal processing component 1110 may digitally process, in accordance with the digital repeating operation, the communication to regenerate a signal associated with the communication. In some aspects, the signal processing component 1110 may include one or more antennas, a demodulator, a MIMO detector, a receive processor, a modulator, a transmit MIMO processor, a transmit processor, a controller/processor, a memory, or a combination thereof, of the repeater node described above in connection with FIG. 2. The transmission component 1104 may transmit the regenerated signal associated with the communication.

The determination component 1112 may determine a channel condition value associated with the communication based at least in part on performing the measurement associated with the communication. In some aspects, the determination component 1112 may include one or more of a receive processor, a modulator, a transmit MIMO processor, a transmit processor, a controller/processor, a memory, or a combination thereof, of the repeater node described above in connection with FIG. 2. In some aspects, the determination component 1112 may communicate with or be included in the measurement component 1108.

The determination component 1112 may determine whether the channel condition value satisfies a threshold, wherein transmitting the measurement report indicating the channel condition value is based at least in part on the determination of whether the channel condition value satisfies the threshold.

The reception component 1102 may receive, from the control node, an indication of whether to forward the communication, wherein the indication is based at least in part on the feedback communication.

The reception component 1102 may receive, from the control node, a configuration indicating a set of forwarding parameters, wherein the configuration is based at least in part on the feedback communication.

The transmission component 1104 may forward the communication in accordance with the configuration.

The reception component 1102 may receive, from the control node, a configuration indicating a set of forwarding parameters for upcoming communications associated with the digital repeating operation, wherein the configuration is based at least in part on the feedback communication.

The reception component 1102 may receive an indication to replace the stored communication with a retransmitted communication, wherein the indication to replace the stored communication with the retransmitted communication is based at least in part on the feedback communication.

The reception component 1102 may receive an indication that the repeater node has been selected, from a plurality of repeater nodes, to forward the communication, wherein the indication is based at least in part on the feedback communication.

The reception component 1102 may receive, from the control node, a configuration indicating a set of feedback parameters associated with transmitting feedback communications to the control node wherein transmitting, to the control node, the feedback communication comprises.

The transmission component 1104 may transmit the feedback communication in accordance with the configuration. The transmission component 1104 may transmit, to one or more wireless nodes associated with the digital repeating operation, the feedback communication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

FIG. 12 is a block diagram of an example apparatus 1200 for wireless communication. The apparatus 1200 may be a control node, or a control node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208, a feedback processing component 1210, among other examples.

In some aspects, the apparatus 1200 may be configured to perform one or more operations described herein in connection with FIGS. 6-8. Additionally or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the control node described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the control node described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the control node described above in connection with FIG. 2. In some aspects, the transmission component 1204 may be co-located with the reception component 1202 in a transceiver.

The reception component 1202 may receive, from a repeater node, a feedback communication that is based at least in part on a communication that is to be forwarded by the repeater node in accordance with a digital repeating operation. The transmission component 1204 may transmit, to the repeater node, a configuration associated with the digital repeating operation, wherein the configuration is based at least in part on the feedback communication.

The transmission component 1204 may transmit, to the repeater node, the communication that is to be forwarded by the repeater node in accordance with a digital repeating operation. The transmission component 1204 may transmit, to the repeater node, the communication that is to be forwarded by the repeater node.

The reception component 1202 may receive, from the repeater node, a regenerated signal associated with the communication in accordance with the digital repeating operation.

The determination component 1208 may determine whether the repeater node is to forward the communication based at least in part on the feedback communication. In some aspects, the determination component 1208 may include one or more of a receive processor, a modulator, a transmit MIMO processor, a transmit processor, a controller/processor, a memory, or a combination thereof, of the control node described above in connection with FIG. 2. The transmission component 1204 may transmit, to the repeater node, an indication of whether the repeater node is to forward the communication.

The determination component 1208 may determine a set of forwarding parameters, based at least in part on the feedback communication, for the repeater node to use when forwarding the communication. The transmission component 1204 may transmit, to the repeater node, a configuration indicating the set of forwarding parameters. The determination component 1208 may determine a set of forwarding parameters, based at least in part on the feedback communication, for the repeater node to use when forwarding upcoming communications. The transmission component 1204 may transmit, to the repeater node, a configuration indicating the set of forwarding parameters.

The determination component 1208 may determine whether the repeater node is to use the stored communication for forwarding upcoming periodic communications based at least in part on the feedback communication.

The determination component 1208 may determine that the repeater node is not to use the stored communication for forwarding upcoming periodic communications based at least in part on the feedback communication.

The feedback processing component 1210 may cause the communication to be retransmitted to the repeater node. In some aspects, the feedback processing component 1210 may include one or more antennas, a demodulator, a MIMO detector, a receive processor, a modulator, a transmit MIMO processor, a transmit processor, a controller/processor, a memory, or a combination thereof, of the control node described above in connection with FIG. 2. In some aspects, the feedback processing component 1210 may cause the transmission component 1204 to retransmit the communication to the repeater node.

The transmission component 1204 may transmit, to the repeater node, an indication to replace the stored communication with the retransmitted communication.

The determination component 1208 may compare the plurality of feedback communications. The determination component 1208 may determine that the repeater node is to forward the communication based at least in part on comparing the plurality of feedback communications. The transmission component 1204 may transmit, to the repeater node, an indication that the repeater node is to forward the communication.

The determination component 1208 may determine a set of feedback parameters associated with feedback communication transmissions by the repeater node. The transmission component 1204 may transmit, to the repeater node, a configuration indicating the set of feedback parameters.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a repeater node, comprising: receiving a communication, wherein the communication is to be forwarded by the repeater node in accordance with a digital repeating operation; performing a measurement associated with the communication; and transmitting, to a control node, a feedback communication that is based at least in part on the measurement associated with the communication.

Aspect 2: The method of Aspect 1, wherein receiving the communication comprises: receiving, from the control node, the communication.

Aspect 3: The method of any of Aspects 1-2, further comprising: forwarding, to the control node, the communication in accordance with the digital repeating operation.

Aspect 4: The method of any of Aspects 1-3, further comprising: digitally processing, in accordance with the digital repeating operation, the communication to regenerate a signal associated with the communication; and transmitting the regenerated signal associated with the communication.

Aspect 5: The method of Aspect 4, wherein transmitting, to the control node, the feedback communication comprises: transmitting the feedback communication before the transmission of the regenerated signal associated with the communication.

Aspect 6: The method of Aspect 4, wherein transmitting, to the control node, the feedback communication comprises: transmitting the feedback communication after the transmission of the regenerated signal associated with the communication.

Aspect 7: The method of any of Aspects 1-6, wherein the feedback communication is a function of the measurement associated with the communication.

Aspect 8: The method of any of Aspects 1-7, wherein performing the measurement associated with the communication comprises: performing a measurement of a reference signal associated with the communication.

Aspect 9: The method of any of Aspects 1-8, wherein the feedback communication comprises acknowledgment or negative acknowledgement feedback.

Aspect 10: The method of any of Aspects 1-9, further comprising: determining a channel condition value associated with the communication based at least in part on performing the measurement associated with the communication.

Aspect 11: The method of Aspect 10, wherein transmitting, to the control node, the feedback communication comprises: determining whether the channel condition value satisfies a threshold; and transmitting, to the control node, acknowledgment or negative acknowledgement feedback based at least in part on the determination of whether the channel condition value satisfies the threshold.

Aspect 12: The method of any of Aspects 10-11, further comprising: determining whether the channel condition value satisfies a threshold; and transmitting a measurement report indicating the channel condition value based at least in part on a determination that the channel condition value does not satisfy the threshold.

Aspect 13: The method of any of Aspects 1-12, wherein the feedback communication comprises: a measurement report indicating at least one of a measured received power, a measured received quality, or a channel condition value.

Aspect 14: The method of any of Aspects 1-13, further comprising: receiving, from the control node, an indication of whether to forward the communication, wherein the indication is based at least in part on the feedback communication.

Aspect 15: The method of Aspect 14, wherein receiving, from the control node, the indication of whether to forward the communication comprises receiving an indication to not forward to the communication, the method further comprising: receiving another communication indicating information that is the same as information indicated by the communication.

Aspect 16: The method of Aspect 15, wherein the other communication is transmitted using a different transmit configuration than a transmit configuration used to transmit the communication.

Aspect 17: The method of any of Aspects 1-16, further comprising: receiving, from the control node, a configuration indicating a set of forwarding parameters, wherein the configuration is based at least in part on the feedback communication; and forwarding the communication in accordance with the configuration.

Aspect 18: The method of Aspect 17, wherein the set of forwarding parameters includes at least one of: a transmit power, a beamforming configuration, or a quantity of repetitions.

Aspect 19: The method of any of Aspects 1-18, further comprising: receiving, from the control node, a configuration indicating a set of forwarding parameters for upcoming communications associated with the digital repeating operation, wherein the configuration is based at least in part on the feedback communication.

Aspect 20: The method of any of Aspects 1-19, wherein the communication is a semi-static communication.

Aspect 21: The method of any of Aspects 1-19, wherein the communication is a periodic communication, the method further comprising: storing the communication; and forwarding the stored communication in accordance with a periodic schedule associated with the communication.

Aspect 22: The method of Aspect 21, further comprising: receiving an indication to replace the stored communication with a retransmitted communication, wherein the indication to replace the stored communication with the retransmitted communication is based at least in part on the feedback communication.

Aspect 23: The method of any of Aspects 1-22, further comprising: receiving an indication that the repeater node has been selected, from a plurality of repeater nodes, to forward the communication, wherein the indication is based at least in part on the feedback communication.

Aspect 24: The method of any of Aspects 1-23, further comprising: receiving, from the control node, a configuration indicating a set of feedback parameters associated with transmitting feedback communications to the control node, wherein transmitting, to the control node, the feedback communication comprises: transmitting the feedback communication in accordance with the configuration.

Aspect 25: The method of any of Aspects 1-24, further comprising: transmitting, to one or more wireless nodes associated with the digital repeating operation, the feedback communication.

Aspect 26: The method of any of Aspects 1-25, wherein the communication is at least one of: a physical downlink control channel communication, a physical downlink shared channel communication, a physical uplink control channel communication, a physical uplink shared channel communication, or a physical sidelink channel communication.

Aspect 27: The method of any of Aspects 1-26, wherein the communication is not fully decoded by the repeater node.

Aspect 28: A method of wireless communication performed by a control node, comprising: receiving, from a repeater node, a feedback communication that is based at least in part on a communication that is to be forwarded by the repeater node in accordance with a digital repeating operation; and transmitting, to the repeater node, a configuration associated with the digital repeating operation, wherein the configuration is based at least in part on the feedback communication.

Aspect 29: The method of Aspect 28, further comprising: transmitting, to the repeater node, the communication that is to be forwarded by the repeater node in accordance with a digital repeating operation.

Aspect 30: The method of any of Aspects 28-29, wherein the digital repeating operation includes the repeater node forwarding a regenerated signal associated with communication based at least in part on a digital processing operation performed by the repeater node.

Aspect 31: The method of any of Aspects 28-30, further comprising: transmitting, to the repeater node, the communication that is to be forwarded by the repeater node.

Aspect 32: The method of any of Aspects 28-31, further comprising: receiving, from the repeater node, a regenerated signal associated with the communication in accordance with the digital repeating operation.

Aspect 33: The method of any of Aspects 28-32, wherein receiving, from the repeater node, the feedback communication comprises: receiving the feedback communication before the repeater node forwards the communication.

Aspect 34: The method of any of Aspects 28-32, wherein receiving, from the repeater node, the feedback communication comprises: receiving the feedback communication after the repeater node forwards the communication.

Aspect 35: The method of any of Aspects 28-34, wherein receiving, from the repeater node, the feedback communication comprises: receiving, from the repeater node, acknowledgement or negative acknowledgement feedback associated with the communication that is to be forwarded by the repeater node.

Aspect 36: The method of Aspect 35, wherein the acknowledgement or negative acknowledgement feedback indicates whether a channel condition value associated with the communication that is to be forwarded by the repeater node satisfies a threshold.

Aspect 37: The method of any of Aspects 28-36, wherein the feedback communication comprises: a measurement report indicating at least one of a measured received power, a measured received quality, or a channel condition value associated with the communication that is to be forwarded by the repeater node.

Aspect 38: The method of Aspect 37, wherein the measurement report indicates that the channel condition value associated with the communication that is to be forwarded by the repeater node does not satisfy a threshold.

Aspect 39: The method of any of Aspects 28-38, further comprising: determining whether the repeater node is to forward the communication based at least in part on the feedback communication.

Aspect 40: The method of Aspect 39, further comprising: transmitting, to the repeater node, an indication of whether the repeater node is to forward the communication.

Aspect 41: The method of any of Aspects 39-40, wherein determining whether the repeater node is to forward the communication based at least in part on the feedback communication comprises: determining that the repeater node is not to forward the communication based at least in part on the feedback communication; and causing the communication to be retransmitted to the repeater node based at least in part on the determination that the repeater node is not to forward the communication.

Aspect 42: The method of Aspect 41, wherein causing the communication to be retransmitted to the repeater node comprises: causing the communication to be retransmitted using a different transmit configuration than a transmit configuration that was used to transmit the communication to the repeater node.

Aspect 43: The method of any of Aspects 28-42, further comprising: determining a set of forwarding parameters, based at least in part on the feedback communication, for the repeater node to use when forwarding the communication; and transmitting, to the repeater node, a configuration indicating the set of forwarding parameters.

Aspect 44: The method of Aspect 43, wherein the set of forwarding parameters includes at least one of: a transmit power, a beamforming configuration, or a quantity of repetitions.

Aspect 45: The method of any of Aspects 28-44, further comprising: determining a set of forwarding parameters, based at least in part on the feedback communication, for the repeater node to use when forwarding upcoming communications; and transmitting, to the repeater node, a configuration indicating the set of forwarding parameters.

Aspect 46: The method of any of Aspects 28-45, wherein the communication that is to be forwarded by the repeater node is a semi-static communication.

Aspect 47: The method of any of Aspects 28-45, wherein the communication that is to be forwarded by the repeater node is a periodic communication that is to be stored by the repeater node.

Aspect 48: The method of Aspect 47, further comprising: determining whether the repeater node is to use the stored communication for forwarding upcoming periodic communications based at least in part on the feedback communication.

Aspect 49: The method of any of Aspects 47-48, further comprising: determining that the repeater node is not to use the stored communication for forwarding upcoming periodic communications based at least in part on the feedback communication; causing the communication to be retransmitted to the repeater node; and transmitting, to the repeater node, an indication to replace the stored communication with the retransmitted communication.

Aspect 50: The method of any of Aspects 28-49, wherein receiving, from the repeater node, the feedback communication comprises: receiving, from a plurality of repeater nodes, a plurality of feedback communications associated with the communication to be forwarded by the plurality of repeater nodes.

Aspect 51: The method of Aspect 50, further comprising: comparing the plurality of feedback communications; determining that the repeater node is to forward the communication based at least in part on comparing the plurality of feedback communications; and transmitting, to the repeater node, an indication that the repeater node is to forward the communication.

Aspect 52: The method of any of Aspects 28-51, further comprising: determining a set of feedback parameters associated with feedback communication transmissions by the repeater node; and transmitting, to the repeater node, a configuration indicating the set of feedback parameters.

Aspect 53: The method of any of Aspects 28-52, wherein the communication that is to be forwarded by the repeater node is at least one of: a physical downlink control channel communication, a physical downlink shared channel communication, a physical uplink control channel communication, a physical uplink shared channel communication, or a physical sidelink channel communication.

Aspect 54: An apparatus for wireless communication at a device, comprising a processor; memory coupled with the processor; and instructions stored in the memory and executable by the processor to cause the apparatus to perform the method of one or more of Aspects 1-27.

Aspect 55: A device for wireless communication, comprising a memory and one or more processors coupled to the memory, the one or more processors configured to perform the method of one or more of Aspects 1-27.

Aspect 56: An apparatus for wireless communication, comprising at least one means for performing the method of one or more of Aspects 1-27.

Aspect 57: A non-transitory computer-readable medium storing code for wireless communication, the code comprising instructions executable by a processor to perform the method of one or more of Aspects 1-27.

Aspect 58: A non-transitory computer-readable medium storing a set of instructions for wireless communication, the set of instructions comprising one or more instructions that, when executed by one or more processors of a device, cause the device to perform the method of one or more of Aspects 1-27.

Aspect 59: An apparatus for wireless communication at a device, comprising a processor; memory coupled with the processor; and instructions stored in the memory and executable by the processor to cause the apparatus to perform the method of one or more of Aspects 28-53.

Aspect 60: A device for wireless communication, comprising a memory and one or more processors coupled to the memory, the one or more processors configured to perform the method of one or more of Aspects 28-53.

Aspect 61: An apparatus for wireless communication, comprising at least one means for performing the method of one or more of Aspects 28-53.

Aspect 62: A non-transitory computer-readable medium storing code for wireless communication, the code comprising instructions executable by a processor to perform the method of one or more of Aspects 28-53.

Aspect 63: A non-transitory computer-readable medium storing a set of instructions for wireless communication, the set of instructions comprising one or more instructions that, when executed by one or more processors of a device, cause the device to perform the method of one or more of Aspects 28-53.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a repeater node, comprising:
   receiving a communication, wherein the communication is to be forwarded by the repeater node in accordance with a digital repeating operation;
   performing a measurement associated with the communication;
   digitally processing, in accordance with the digital repeating operation, the communication to regenerate a signal associated with the communication;
   transmitting the regenerated signal associated with the communication; and
   transmitting, to a control node, a feedback communication that is based at least in part on the measurement associated with the communication, wherein the feedback communication is transmitted before the transmission of the regenerated signal associated with the communication.

2. The method of claim 1, wherein the feedback communication is a function of the measurement associated with the communication.

3. The method of claim 1, wherein the feedback communication comprises:
   a measurement report indicating at least one of a measured received power, a measured received quality, or a channel condition value.

4. The method of claim 1, further comprising:
   receiving, from the control node, an indication of whether to forward the communication, wherein the indication is based at least in part on the feedback communication.

5. The method of claim 4, wherein receiving, from the control node, the indication of whether to forward the communication comprises receiving an indication to not forward to the communication, the method further comprising:
   receiving another communication indicating information that is the same as information indicated by the communication.

6. The method of claim 1, further comprising:
   receiving, from the control node, a configuration indicating a set of forwarding parameters, wherein the configuration is based at least in part on the feedback communication; and
   forwarding the communication in accordance with the configuration.

7. The method of claim 1, further comprising:
   receiving, from the control node, a configuration indicating a set of forwarding parameters for upcoming communications associated with the digital repeating operation, wherein the configuration is based at least in part on the feedback communication.

8. The method of claim 1, wherein the communication is a periodic communication, the method further comprising:
   storing the communication; and
   forwarding the stored communication in accordance with a periodic schedule associated with the communication.

9. The method of claim 8, further comprising:
   receiving an indication to replace the stored communication with a retransmitted communication, wherein the indication to replace the stored communication with the retransmitted communication is based at least in part on the feedback communication.

10. The method of claim 1, further comprising:
    receiving an indication that the repeater node has been selected, from a plurality of repeater nodes, to forward the communication, wherein the indication is based at least in part on the feedback communication.

11. The method of claim 1, further comprising:
    transmitting, to one or more wireless nodes associated with the digital repeating operation, the feedback communication.

12. A repeater node for wireless communication, comprising:
    a memory; and
    one or more processors, coupled to the memory, configured to:
      receive a communication, wherein the communication is to be forwarded by the repeater node in accordance with a digital repeating operation;
      perform a measurement associated with the communication;

digitally process, in accordance with the digital repeating operation, the communication to regenerate a signal associated with the communication;

transmit the regenerated signal associated with the communication; and transmit, to a control node, a feedback communication that is based at least in part on the measurement associated with the communication, wherein the feedback communication is transmitted before the transmission of the regenerated signal associated with the communication.

13. The repeater node of claim 12, wherein the feedback communication is a function of the measurement associated with the communication.

14. The repeater node of claim 12, wherein the feedback communication comprises:

a measurement report indicating at least one of a measured received power, a measured received quality, or a channel condition value.

15. The repeater node of claim 12, wherein the one or more processors are further configured to:

receive, from the control node, an indication of whether to forward the communication, wherein the indication is based at least in part on the feedback communication.

16. The repeater node of claim 15, wherein the one or more processors, to receive, from the control node, the indication of whether to forward the communication, are configured to receive an indication to not forward to the communication, and wherein the one or more processors are further configured to:

receive another communication indicating information that is the same as information indicated by the communication.

17. The repeater node of claim 12, wherein the one or more processors are further configured to:

receive, from the control node, a configuration indicating a set of forwarding parameters, wherein the configuration is based at least in part on the feedback communication; and forward the communication in accordance with the configuration.

18. The repeater node of claim 12, wherein the one or more processors are further configured to:

receive, from the control node, a configuration indicating a set of forwarding parameters for upcoming communications associated with the digital repeating operation, wherein the configuration is based at least in part on the feedback communication.

19. The repeater node of claim 12, wherein the communication is a periodic communication, and wherein the one or more processors are further configured to:

store the communication; and forward the stored communication in accordance with a periodic schedule associated with the communication.

20. The repeater node of claim 19, wherein the one or more processors are further configured to:

receive an indication to replace the stored communication with a retransmitted communication, wherein the indication to replace the stored communication with the retransmitted communication is based at least in part on the feedback communication.

21. The repeater node of claim 12, wherein the one or more processors are further configured to:

receive an indication that the repeater node has been selected, from a plurality of repeater nodes, to forward the communication, wherein the indication is based at least in part on the feedback communication.

22. The repeater node of claim 12, wherein the one or more processors are further configured to:

transmit, to one or more wireless nodes associated with the digital repeating operation, the feedback communication.

23. A non-transitory computer-readable medium storing a set of instructions for wireless communication, the set of instructions comprising:

one or more instructions that, when executed by one or more processors of a repeater node, cause the repeater node to:

receive a communication, wherein the communication is to be forwarded by the repeater node in accordance with a digital repeating operation;

perform a measurement associated with the communication;

digitally process, in accordance with the digital repeating operation, the communication to regenerate a signal associated with the communication;

transmit the regenerated signal associated with the communication; and transmit, to a control node, a feedback communication that is based at least in part on the measurement associated with the communication, wherein the feedback communication is transmitted before the transmission of the regenerated signal associated with the communication.

24. An apparatus for wireless communication, comprising:

means for receiving a communication, wherein the communication is to be forwarded by the apparatus in accordance with a digital repeating operation;

means for performing a measurement associated with the communication;

mean for digitally processing, in accordance with the digital repeating operation, the communication to regenerate a signal associated with the communication;

means for transmitting the regenerated signal associated with the communication; and means for transmitting, to a control node, a feedback communication that is based at least in part on the measurement associated with the communication, wherein the feedback communication is transmitted before the transmission of the regenerated signal associated with the communication.

\* \* \* \* \*